(12) United States Patent
Mohanty et al.

(10) Patent No.: US 7,649,036 B2
(45) Date of Patent: Jan. 19, 2010

(54) "GREEN" MATERIALS FROM SOY MEAL AND NATURAL RUBBER BLENDS

(75) Inventors: Amar K. Mohanty, Lansing, MI (US); Qiangxian Wu, East Lansing, MI (US); Susan Selke, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 534 days.

(21) Appl. No.: 11/200,593

(22) Filed: Aug. 10, 2005

(65) Prior Publication Data
US 2006/0041036 A1 Feb. 23, 2006

Related U.S. Application Data

(60) Provisional application No. 60/602,727, filed on Aug. 19, 2004, provisional application No. 60/629,663, filed on Nov. 19, 2004.

(51) Int. Cl.
*C08L 89/00* (2006.01)
*A23L 1/20* (2006.01)

(52) U.S. Cl. .............. 524/9; 524/17; 524/20; 524/21; 524/575.5; 524/702; 426/634

(58) Field of Classification Search .............. None
See application file for complete search history.

(56) References Cited

U.S. PATENT DOCUMENTS

| | | | | |
|---|---|---|---|---|
| 2,931,845 A | * | 4/1960 | Lehmann | 524/25 |
| 4,158,656 A | * | 6/1979 | Jones et al. | 530/377 |
| 6,527,990 B2 | * | 3/2003 | Yamashita et al. | 264/45.1 |

OTHER PUBLICATIONS

Max Milner "Protein Resources and Technology: Status and Resarch" 1978, pp. 282-284.*

* cited by examiner

*Primary Examiner*—Vasu Jagannathan
*Assistant Examiner*—Gennadiy Mesh
(74) *Attorney, Agent, or Firm*—Ian C. McLeod

(57) ABSTRACT

Blended compositions and methods for the production of thermoset compositions of soy meal, which has been treated to remove non-thermoplastic materials associated with soy beans, and natural rubber. Also provided is a method for the preparation of a prepared granular soy meal by blowing a gas through a stream of granular natural soy meal to remove hulls and cellulose fiber materials which are lighter than the granular soy meal to provide the prepared granular soy meal for the compositions. The compositions are elastic and can be used in place of rubber bands and the like.

29 Claims, 15 Drawing Sheets

1. Container
2. Raw Soy Meal
3. Blower fan
4. Collection container
5. Impurities
6. Air current
7. Purified Soy meal

2.5 cm

Figure 4. purified film

"GREEN" MATERIALS FROM SOY MEAL AND NATURAL RUBBER BLENDS

CROSS-REFERENCE TO RELATED APPLICATIONS

This application relies for priority on U.S. Provisional Patent Application Ser. No. 60/602,727 to Mohanty et al., filed Aug. 19, 2004 and Provisional Patent Application Ser. No. 60/629,663 filed Nov. 19, 2004.

STATEMENT REGARDING FEDERALLY SPONSORED RESEARCH OR DEVELOPMENT

Not Applicable.

BACKGROUND OF THE INVENTION (1) Field of the Invention

The present invention relates generally to the utilization of thermoplastic blended compositions of soy meal and natural rubber for the preparation of thermoset biodegradable elastomers.

(2) Description of the Related Art

Non-biodegradable plastics, which are mainly from petroleum resources, are becoming a burden on local landfill. Non-biodegradable plastics waste also increases the pollution of greenhouse gas emissions when burned, which causes the present global warming problem (Kerr, R. Science. 2000, 288 (5466), 589) and (Patel, M. Ph.D. Thesis, Closing carbon cycles: carbon use for materials in the context of resource efficiency and climate change, Utrecht University, Netherlands, December 1999). Therefore, biodegradable polymers have attracted much attention.

At present, biodegradable polymers include synthetic polymers, such as polylactic acid (PLA), biopolymers produced by microorganism, such as polyhydroxybutyrate (PHB) and natural biopolymers, such as starch and protein. The former two kinds (PLA and PHB) of biodegradable polymers are costly (Okada, M. Prog. Polym. Sci. 2002, 27, 87). Special attention is paid to natural biopolymers because they are abundant and low cost.

Soy protein, as the most abundant protein in the world, is classified into soy protein isolate (SPI), soy concentrate (SC), soy flour (SF), and soy meal (SM) their costs being ~$1.50; ~$0.80; ~0.20; ~$ 0.8 per pound respectively. The cheapest soy protein is SM (0.18 US$/kg) (Information from Michigan Soybean Promotion Committee, January, 2003), which contains a minimum of 44% protein. However, this protein has poor processability because protein content is low and non-thermoplastic content is high.

Usually, soy protein isolate containing at least 90% protein has been used to prepare biodegradable materials, as mentioned in several patents (U.S. Pat. No. 6,632,925 to Zhang et al; U.S. Pat. No. 5,710,190 to Jane et al; U.S. Pat. No. 5,523, 293 to Jane et al and U.S. Pat. No. 5,397,834 to Jane et al). In these processes, SPI, plasticizers such as water and glycerol, and other biodegradable polymers such as polylactic acid (PLA), were mixed and fed into an extruder to prepare pellets or foam. Rayas and Hernandez (U.S. Pat. No. 6,045,868) used wheat flour, glycerol as plasticizer, and formaldehyde solution as the cross-linking agent to prepare protein film. Bassi et al (U.S. Pat. No. 5,665,152 to Bassi et al) disclosed a composition of blends of grain protein with starch. The blends were said to be useful for molded plastics, but became brittle and sensitive to water. Sun et al (U.S. Pat. No. 6,716,022 to Sun et al) used wheat straw fiber, soy flour and water to compression-mold livestock feed supplement containers. These containers also became brittle at ambient conditions. As reported, (Zhong et al., Polymer, 2001, 42, 696) soy protein isolate/polycaprolactone blends (50 g/50 g) were brittle ($\sigma_b$=5-7 MPa, $\epsilon_b$=2-3%), and became tough ($\sigma_b$=25-27 MPa, $\epsilon_b$=10-12%) after cross-linking using 5 wt % of methylene diphenyl diisocyanate. However, the two raw materials are expensive.

However, there still exist the following main drawbacks for protein-rich biodegradable materials that has not been overcome by these patents. (1.) Protein becomes brittle at dry state due to the loss of water; (2.) Protein is difficult to process due to a high melting temperature. Therefore, a large amount of plasticizer is needed for processing; (3.) Protein is sensitive to water and has weak mechanical properties in a wet state; (4.) At a high relative humidity state, plasticizers, such as glycerol or sorbitol, can penetrate out of protein matrix, and form liquid-like drops on the surface of a film. This phenomenon is called as "leaching". The leaching phenomenon limits the usage of natural biopolymers. (5). When the content of protein in polymers blends reaches up to 50 wt % or higher, the mechanical properties of the blends decrease dramatically and can not satisfy customers' requirement. (6). Soy protein isolate which contains around 90% protein is expensive (~3.3 US$/kg) for plastic applications.

The price of natural rubber (NR, 1.16~1.43 US$/kg for Standard Malaysian Rubber (SMR)) Information from http://www.rubbercommerce.com/priceindices_unreg.jsp#, update Jul. 23, 2004 is cheaper than that of low density polyethylene (LDPE, 1.47~1.69 US$/kg Information from http://www-.plasticsnews.com/subscriber/resin/price1.html, update Jul. 23, 2004. In addition, natural rubber is a bio-based and biodegradable natural polymer while LDPE is not. Therefore, natural rubber has potential for developing low cost biodegradable polymers. Ezoe (U.S. Pat. No. 5,523,331 to Ezoe) blended natural rubber (67 wt %) and starch etc., in an extruder, and then vulcanized the blends to prepare biodegradable articles. But it was difficult to reduce the content of natural rubber below 50% because starch was not plasticized, making the blends difficult to process if starch content reached a high level. Japanese Patent, P2001-288295A, to Katuaki directly blended natural rubber (60 wt %) and corn protein to prepare biodegradable thermoplastic in an extruder, but the blends had leaching problems because of the existence of the large amount of plasticizers, such as glycerol. In addition, the blends were very sticky because the natural rubber was not vulcanized. To improve the flexibility of thermoplastic starch, 2.5-20 wt % of natural rubber was blended into a starch matrix in an intensive mixer at 150° C. (Carvalho, A. J. F.; Job, A. E.; Alves, N.; Curvelo, A. A. S.; Gandini, A., Carbohydr. Polym. 2003, 53(1), 95). Results revealed a reduction in tensile strength and an improvement in flexibility. These blends can have stickiness problems, although the natural rubber content is low.

While the related art teach blends of natural rubber and biopolymers, there still exists a need for improved biodegradable thermoset blended compositions.

OBJECTS

Therefore, it is an object of the present invention to provide thermoset blended compositions from soy meal and vulcanized natural rubber.

It is further an object of the present invention to provide vulcanized thermoset blended compositions which are low cost, elastic and biodegradable.

These and other objects will become increasingly apparent by reference to the following description.

SUMMARY OF THE INVENTION

The present invention provides an uncured and unvulcanized thermoplastic blended composition which comprises: (a) a soy meal mixture, the soy meal which has been treated to remove hulls and cellulose fiber materials associated with soy beans, the mixture comprising about 20% or less by weight water; and (b) an unvulcanized natural rubber mixture having sulfur as a vulcanization agent and a vulcanization accelerator, wherein the blended composition can be vulcanized to a thermoset solid.

In further embodiments, the soy meal mixture has been processed at 80-100° C. In still further embodiments, the soy meal mixture to natural rubber mixture ratio is approximately 70:50 (w/w). In still further embodiments, the vulcanization accelerator is a dithiocarbamate accelerator. In still further embodiments, the dithiocarbamate accelerator is zinc diethyldithiocarbamate (ZDEC).

The present invention provides a thermoset blended composition which comprises: (a) a soy meal mixture, the soy meal which has been treated to remove hulls and cellulose fiber materials associated with soy beans, the mixture comprising about 20% or less by weight water; and (b) a natural rubber mixture having sulfur as a vulcanization agent and a vulcanization accelerator, wherein the blended composition has been vulcanized to a thermoset solid.

In further embodiments, the soy meal mixture to natural rubber mixture ratio is approximately 70:50 (w/w). In still further embodiments, the soy meal is approximately 51 percent by weight of the composition when dried. In still further embodiments, the vulcanization accelerator is a dithiocarbamate accelerator. In still further embodiments, the dithiocarbamate accelerator is zinc diethyldithiocarbamate (ZDEC). In further embodiments, the composition has been vulcanized at approximately 90° C. In still further embodiments, the soy meal mixture has been processed at 80-100° C.

The present invention provides a method for the production of a thermoset blended composition which comprises: (a) providing a soy meal mixture, which has been treated to remove hulls and cellulose fiber materials associated with soy beans, the soy meal mixture comprising about 20% or less by weight water; and unvulcanized natural rubber containing sulfur as a vulcanization agent, and a vulcanization accelerator; and (b) vulcanizing the blended composition to produce the thermoset solid composition.

In further embodiments of the method, the vulcanization is performed at approximately 90° C. In still further embodiments, the soy meal mixture has been processed at 80-100° C. In still further embodiments, the soy meal mixture to natural rubber mixture ratio is approximately 70:50 (w/w). In still further embodiments, the vulcanization accelerator is a dithiocarbamate accelerator. In still further embodiments, the dithiocarbamate accelerator is ZDEC. In still further embodiments, the soy meal is approximately 51 percent by weight of the composition when dried.

The present invention relates to a thermoset blended composition which comprises soy meal, which has been treated to remove hulls and cellulose fiber materials associated with soy beans, the soy meal containing less than about 7.5% water; and vulcanized natural rubber. Preferably, the composition comprises 30% to 70% soy meal, 12.5% to 62.5% unvulcanized rubber which has been vulcanized, and 7.5% to 17.5% water, all by weight. Preferably, the rubber was vulcanized with sulfur as a vulcanization agent and a vulcanization accelerator. Most preferably, the rubber was vulcanized with sulfur and zinc diethyldithiocarbamate as a vulcanization accelerator. Most preferably the composition is substantially free of organic plasticizers.

The present invention relates to an uncured and unvulcanized thermoplastic blended composition which comprises a blend of soy meal, which has been treated to remove hulls and cellulose fiber materials associated with soy beans, the soy meal comprising between about 5% and 10% by weight water; and unvulcanized natural rubber containing sulfur as a vulcanization agent and a vulcanization accelerator, wherein the blended composition can be vulcanized to a thermoset solid. Preferably, the composition comprises 30% to 70% soy meal, 12.5% to 62.5% vulcanized natural rubber, and 7.5% to 17.5% water, all by weight. Most preferably, the unvulcanized natural rubber comprises sulfur as a vulcanization agent and zinc diethyldithiocarbamate as an accelerator. Most preferably the composition is substantially free of organic plasticizers.

The present invention also relates to a method for the production of a thermoset blended composition which comprises providing a blend of soy meal, which has been treated to remove hulls and cellulose fiber materials associated with soy beans, the soy meal comprising between about 5% and 10% by weight water; and unvulcanized natural rubber containing sulfur as a vulcanization agent, and a vulcanization accelerator; and vulcanizing the blended composition to produce the thermoset solid composition. Preferably, the vulcanization is between 25° C. and 95° C. Preferably, the soy meal is in a particle form and is exposed to an air stream to separate the materials from the soy meal. Preferably (a) the soy meal and the water; and (b) the natural rubber, the accelerator and the sulfur are blended in an extruder to provide the blend of step (a). Also, preferably (i) the soy meal and the water, and (ii) the natural rubber, sulfur and accelerator are blended together in a mixer to provide the blend of step (a). Preferably the composition is as a fiber band or tube.

The present invention relates to a method for the preparation of a prepared granular soy meal which comprises providing a granular natural soy meal containing dispersed non-thermoset materials associated with soy beans; and blowing a gas through a stream of the granular natural soy meal to remove the non-thermoset materials which are lighter than the granular soy meal to remove the non-thermoset materials and to provide the prepared granular soy meal. Preferably, the gas is air under ambient conditions. Preferably, the composition is as film, band or tube.

BRIEF DESCRIPTION OF THE DRAWINGS

FIGS. 3 and 4 show images of films from two fractionations. The purified SM powder is SSMP. FIG. 3 shows an image of film from impurities. FIG. 4 shows an image of film from purified soy meal.

FIG. 10 is an image of the soy/bio-rubber band of the present invention having 51 wt % dry SSMP (3.0 mm×3 m). FIG. 11 shows the use of the soy/bio-rubber band of the present invention to bind plants/grasses.

DETAILED DESCRIPTION OF THE INVENTION

Figure 1:
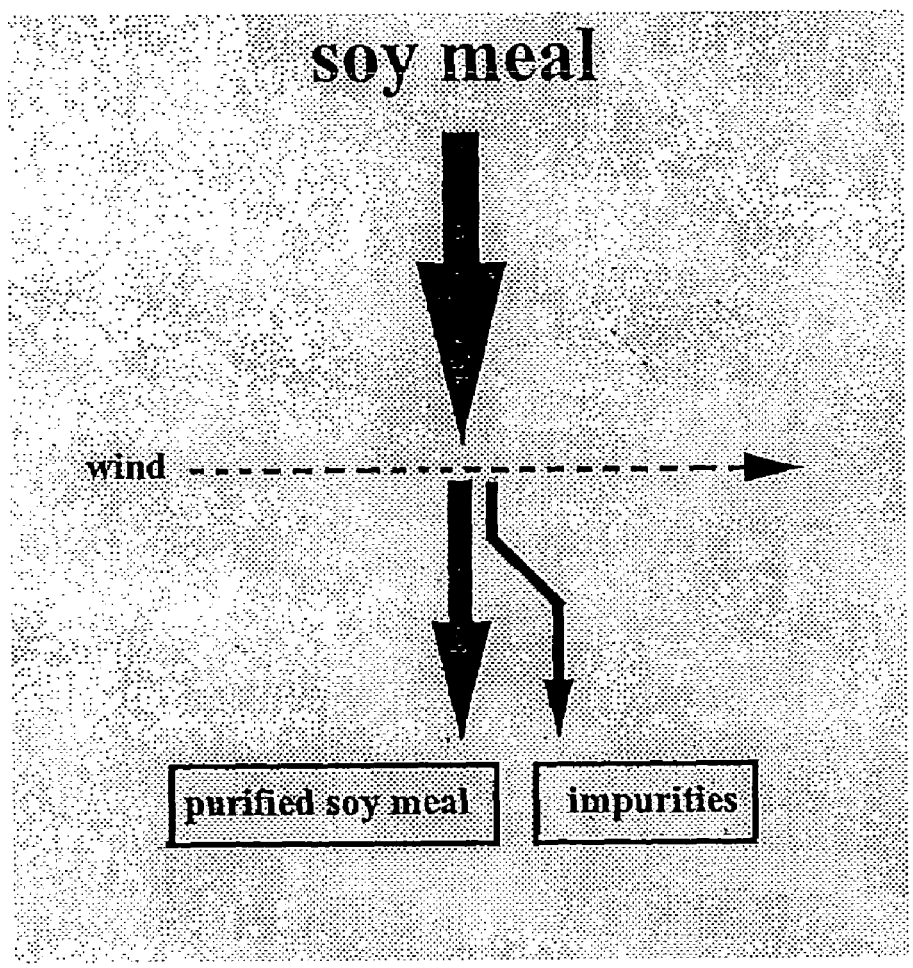
FIGS. 1 and 2 show the principle (FIG. 1) and image (FIG. 2) of the wind-blowing method.

All patents, patent applications, government publications, government regulations, and literature references cited in this specification are hereby incorporated herein by reference in their entirety. In case of conflict, the present description, including definitions, will control.

Soy meal: The soybean processing industry in Michigan, after extraction of oil from soybeans, sells the residual soy meal at a price of ~180/ton (~8 cents/lb.) for animal meal. Such inexpensive soy meal is converted in to value-added product of commercial attraction by the present invention.

Low cost and biodegradable blends from soy meal and natural rubber were first prepared in an extruder. The blends can be shaped into band, film, sheet and tube. Secondly, the blends were vulcanized and became elastic and stable. A bio-rubber band with commercial potential was also prepared.

Natural rubber-based biodegradable polymer: The price of natural rubber (1.16~1.43 $/kg for Standard Malaysian Rubber (SMR)) is cheaper than that of low density polyethylene (LDPE, 1.47~1.69 $/kg). In addition, natural rubber is a bio-based and biodegradable natural polymer but LDPE is not. Therefore, natural rubber has a potential for developing low cost biodegradable polymers. Ezoe first blended natural rubber (67 wt %) and starch, carboxymethylcellulose, coagulant, lecithin, casein, water soluble fertilizers in an extruder, and then vulcanized the blends to prepare biodegradable articles for binding pot soil in the field of agriculture (U.S. Pat. No. 5,523,331 to Ezoe). But the content of natural rubber is difficult to be equal or lower than 50% because there was no enough plasticizer for starch or carboxymethylcellulose, which would make the blends difficult to process if starch or carboxymethylcellulose content reached a high level. The processing conditions and strength of the blends, the most important data, were not given in this patent. Katuaki directly blended natural rubber (60 wt %) and corn protein to prepare biodegradable thermoplastic in an extruder (Katuaki, M. Japanese Patent, P2001-288295A, 2001). But the blends will have leaching problem because of the existence of much amount of plasticizers such as glycerol. In addition, the blends will be very sticking because natural rubber was not vulcanized. To improve the flexibility of thermoplastic starch, 2.5-20% of natural rubber was blended into starch matrix in an intensive mixer at 150° C. (Carvalho, A. J. F.; Job, A. E.; Alves, N.; Curvelo, A. A. S.; Gandini, A., Carbohydr. Polym. 2003, 53 (1), 95). Results revealed a reduction in tensile strength and a little improvement in flexibility.

Recently, we have found an effective way to overcome or improve the all above six drawbacks. In the first stage, to decrease the cost of raw material, soy meal (SM) was used. But SM is impure and has bad processability due to the existence of hulls and cellulose fibers. It is necessary to cheaply and efficiently remove these impurities from SM to prepare separated soy meal powder (SSMP). The SSMP should be pure enough to prepare transparent film. In the second stage, to extrude the SSMP in an extruder smoothly, optimal water content and temperature range should be designed according to the protein properties. In the third stage, natural rubber (NR) was blended with SSMP and vulcanized to prepare SSMP-rich material that has good flexibility even after drying and has promising water resistance. Because there is no any high boiling temperature plasticizer in the SSMP matrix, the SSMP/NR blend has no leaching problem. The blends can be shaped into bands, sheets, films, tubes and etc by use of an extruder.

Material: Natural rubber (SMR-CV60) was obtained as a gift from Harwick Standard Distribution Corporation (Ohio, USA). Soy meal was a gift sample from Michigan Soybean Promotion Committee (MSPC). The particle distribution of the soy meal is shown as follows: >2000 μm, 25.6 wt %; 1680-2000 μm, 13.1 wt %; 840-1680 μm, 56.9 wt % and <840 μm, 4.4 wt %. N-isopropyl-N'-phenylparaphenylenediamine (IPPD, SANTOFLEX® IPPD-PST-6MM), N-tert-Butyl-2-benzothiazolesulfenamide (PERKACIT® TBBS-GRS), and zinc diethyldithiocarbamate (PERKACIT® ZDEC-PDR) were obtained as gifts from Flexsys company (OH, USA). Stearic Acid (95%) and 2-Mercaptobenzothiazole (MBT, 98%) were purchased from Aldrich, USA. Zinc oxide (ZnO, 99.0%, powder) and sulfur (sublimed powder) was purchased from Columbus Chemical Industries Inc. (WI, USA).

Observation of leaching problem SSMP-NRV-70:50-U was compression-molded at 120° C. for 5 min into film. As control experiments, SSMP, 15 wt % of water and 15 wt % of sorbitol were molded to prepare sorbitol-plasticized SSMP film. SPI, 20 wt % of water and 10 wt % of glycerol were molded to prepare glycerol-plasticized SPI film. Two hundred milliliters (200 mL) of distilled water was added into the bottom of an empty desiccator. Strip-like samples (10 mm×0.2 mm×100 mm) were placed on the screen of the desiccator and the desiccator was sealed to maintain relative humidity (RH) at 100%. Twenty-five hours later, the surfaces of the samples were inspected to evaluate the degree of leaching. A photo was also taken with the FinePix 4500 digital camera to record the results.

Water uptake test cured bars (3.0 mm diameter×100 mm) were weighed ($W_0$) and immersed in water. Twenty-four hours later, wet samples were dried with absorbing papers and weighed ($W_w$) for calculating water uptake (wt %) by use of the following equation.

$$\text{Water uptake (wt \%)} = 100 \times (W_w - W_0)/W_0 \quad (1)$$

Tensile test Three series of sample were treated. The first samples were equilibrated at 24.5° C. and 60% relative humidity (RH) for 1 day (ambient state), and used for tensile test. The second ones were dried at 54° C. for 24 h (dry state), and used for tensile test. The third ones were immersed in distilled water for 24 h, then taken out and dried with absorbing papers and equilibrated at ambient conditions for 2 h before testing (wet state). Mechanical properties of the each of the three samples were tested using an Instron tensile tester (Instron 5565, USA). Initial grip separation was 50 mm, tensile speed was 50 mm/min, temperature was 25° C. and RH was 60%. Stress/strain curves were recorded to calculate strength at break ($\sigma_b$, MPa) and elongation at break ($\epsilon_b$, %). For each treatment, at least four specimens were tested to calculate an average value and standard deviation.

Dynamic mechanical analysis (DMA) SSMP-NRV-70:50-U (1 g) was compression-molded at 55° C., 10 ton for 2 min to prepare a film. The film was cut into strip-like samples with dimensions of 4.3×15.6×0.16 mm$^3$. DMA analysis of samples was conducted with a DMA Q800 dynamic mechanical analyzer (TA Instruments, Delaware, USA). A variable-amplitude, sinusoidal tensile stress (frequency=1 Hz) was applied to the sample to produce a sinusoidal strain of ±25 µm amplitude. Because vulcanization in practice is an isothermal process, samples were tested in an isothermal mode (90° C. for 240 min). Signals of storage modulus (MPa) and isotherm time (min) were recorded to draw storage modulus/time curves which were used to characterize the curing reaction of SSMP-NRV-70:50-U. Duplicate tests were conducted.

Thermal gravimetric analysis (TGA) was conducted using a thermal gravimetric analyzer (TGA 2950, TA Instruments, Delaware, USA) to measure the total weight loss of samples. Approximately 10 mg of sample was subjected to heating from 30° C. to 200° C. at 20° C./min in a nitrogen atmosphere (120 mL/min).

Preparation of Separated Soy Meal Powder (SSMP)

Aim: purify soy meal to prepare homogeneous and transparent materials such as films.

Figure 2:
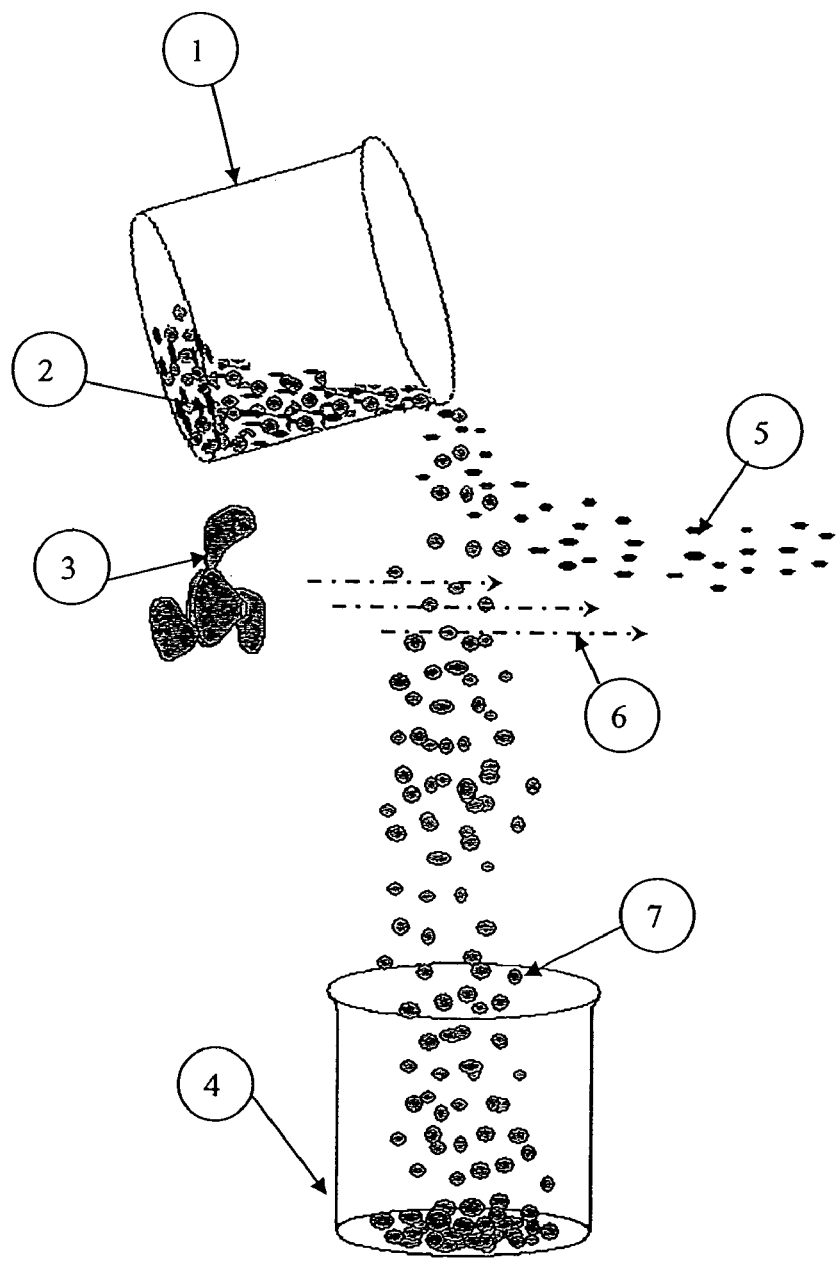

Method: A wind-blowing method was used to separate SM. This method is shown in FIGS. 1 and 2. In FIG. 2, the parts are as follows: (1) container; (2) raw soy meal; (3) blower fan; (4) collection container; (5) impurities; (6) air current; and (7) purified soy meal. The impurities are generally lighter than that of purified SM particles, so SM particles flow was separated in wind into two fractionations: purified SM and impurities. The purified SM was collected and separated again. The wind was produced from a hair drier. The two fractionations were milled in a mill (Cyclone Sample Mill, UDY Corporation, CO, USA) and the screen mesh was 297 µm. The milled and purified SM was SSMP that was fine powder. Film was prepared according to the followed procedure: pellets (6 g) were covered with Teflon films at both sides and the Teflon films were placed between two steel plates. The steel plates were placed between the two steel blocks of a hot press (Carver Laboratory Press, Model M, Fred S. Carver Inc, USA), whose temperature was controlled to be 125° C., and then was compression-molded at 1 ton for 1 min. After the premix was pre-heated, the pressure was quickly increased from 1 ton to 15 ton. 8 min later, the mold was cooled to below 50° C. by water-cooling system at a rate of 20° C./min. A yellow and transparent film with a thickness of 0.2 mm was released from the mold, and stored in a polyethylene bag. The extending area of film on the Teflon film was used to evaluate melt mobility. Generally, the area is the larger; the melt mobility is the better. A digital camera (FinePix 4500, Fuji Photo Co. LTD, Japan) was used to take a photo.

Figure 3:

Results and Discussion: The percentages of purified SM and impurities are 87.2% and 12.8%, respectively. Each fractionation powder was mixed with 15% water and 15% sorbitol to prepare premix. The premix from purified SM was easily extruded. The premix from the impurity fraction was difficult to extrude. The extruder often stopped automatically because of too high a torque force for impurity sample. The area of compression-molded film from the impurity fractionation was much smaller than that from the SSMP, indicating the melt mobility of SSMP was better than that of impurity fraction. According to our observation, the impurity fractionation is composed of hulls, cellulose fibers and other foreign material, which mainly are non-thermoplastic. Therefore, the processing properties were rather poor. The images of films from two fractionations are shown in FIGS. 3 (with impurities) and 4 (without impurities). There were many particles that could not be melted in the impurity fraction, but not in the SSMP fractionation. Where an automated machine is used to separate SM, SSMP can be pure.

Conclusion: Clearly, it is cheap and effective to separate SM by the wind-blowing method.

Optimization of extrusion conditions for SSMP thermoplastic:

Aim: Raw SSMP is too difficult to extrude. It is necessary to design proper amount of water and proper extrusion temperature to make SSMP easy to extrude. Glycerol or sorbitol were added into SSMP thermoplastic because they can cause a leaching problem.

Method: SSMP and water were mixed in a high-speed bender (Waring Commerical Blendor, model 34BL92, Dynamics Corporation of America, Connecticut, USA) for 1 min. to prepare a premix. The premix (12 g) was fed into a micro twin extruder (DSM research, Netherlands) to prepare the thermoplastic. The DSM extruder was equipped with a circle die with a diameter of 3.0 mm. Extrusion speed, temperature and average screw force were recorded. The extrusion force (N)/time (min) curves of SSMP/plasticizers mixture were also recorded. The morphology of extrudates was inspected.

TABLE 1

Effect of temperature on extrusion. Sample: SSMP/Water = 80/20 (w/w), 20 rpm.

| Temperature ° C. | Average force (N) | Extrudate properties | Mechanical properties |
|---|---|---|---|
| 80 | 3500 | Coarse/yellow | Weak |
| 90 | 3100 | Smooth/yellow | Weak |
| 100 | 2950 | Smooth/yellow | Weak |
| 110 | 2800-7000 | Smooth/yellow | A little stiff |
| 120 | 4500-7000 | Smooth/black | A little stiff |
| 150 | >7000 | Coarse/black | Stiff |

Figure 5:
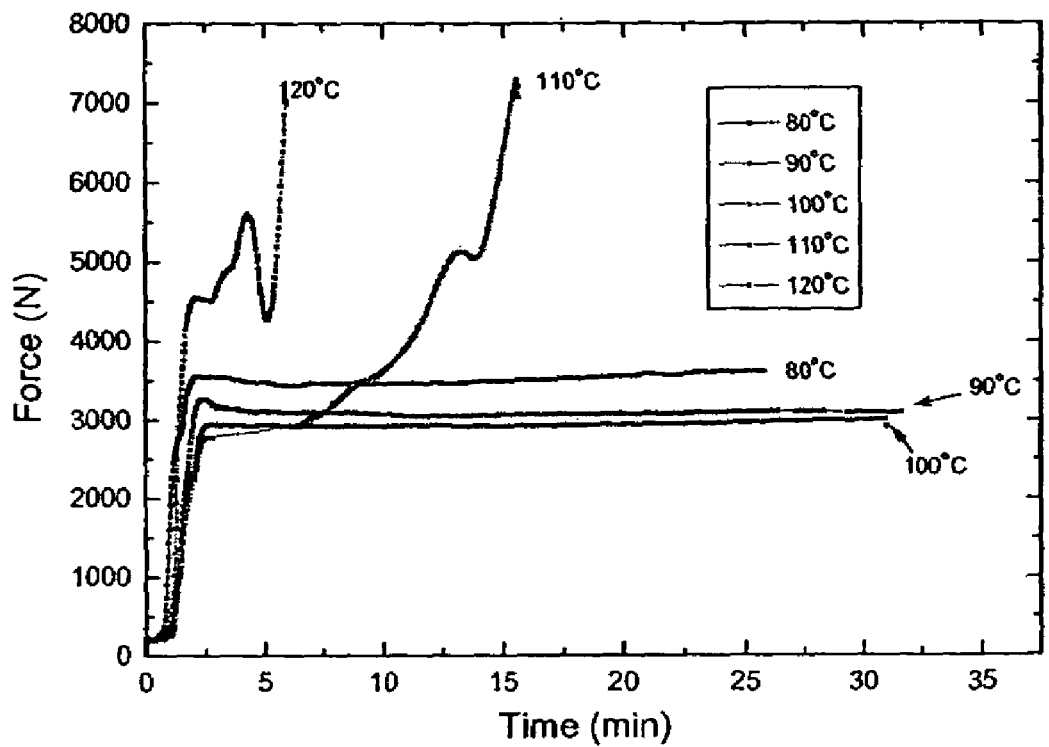
FIG. 5 is a graph of an extrusion force/time curve of SSMP/Water mixture (4:1 w/w) at various processing temperature. Extrusion speed is 20 rpm; sample weight in every extrusion is 12 g.

Results and Discussion: The effect of temperature on extrusion is shown in Table 1. Too high processing temperature (150° C.) evaporate water and the melt viscosity will increase. Low temperatures result in poor polymer mobility, also leading to higher extrusion force (3500 N at 80° C.). At a higher temperature (2950 N at 100° C.), the result was better. When barrel temperature was equal or higher than 110° C., water evaporated quickly and the extrusion force increased with increasing extrusion time as shown in FIG. 5. It can be concluded that an acceptable temperature for SSMP/water (4:1 w/w) is 80-100° C., and optimal processing temperature is 100° C.

The effect of water on extrusion is shown in Table 2. Too much water is a disadvantage for product and too low amount of water in SSMP will lead to high viscosity for processing. Rubber (NR) melt showed high viscosity when being processed, so SSMP/water mixture should have enough low melt viscosity in order to process SSMP/NR smoothly. According to the result from Table 2, 80/20 or 4:1 is an optimal ratio for processing SSMP/water mixture.

TABLE 2

Effect of water content on extrusion. Extrusion conditions: temperature-100° C., motor speed 20 rpm. Water content in this work is the percentage of water adding into SSMP.

| SSMP/water (g/g) | Average force (N) | Extrudate properties | Mechanical properties |
|---|---|---|---|
| 70/30 | 1400 | Smooth/yellow | Weak |
| 80/20 | 2970 | Smooth/yellow | Strong and flexible |
| 90/10 | 6600 | Coarse/yellow | Stiff |

Conclusion: The optimal extrusion conditions are: temperature as 100° C., water content as 25%.

EXAMPLE

Preparation of Flexible SSMP/NR Blends

Aim: Un-vulcanizated SSMP/NR blends are sticky and weak in strength. Vulcanization was necessary to prepare commercially valuable products from SSMP/NR blends. The aim of this experiment was to prepare SSMP/NR blends with high performance by use of vulcanization technology.

Preparation Tough Film by a Two-Step Method.

TABLE 3

Recipe of NRV (unit: g).

| Name | NR | ZnO | Stearic acid | IPPD | Sulfur | MBT |
|---|---|---|---|---|---|---|
| Functions | matrix | activator | activator | anti-oxidant | crosslinker | accelerator |
| Weight | 100 | 5.0 | 2.0 | 2.0 | 1.5 | 1.5 |

Figure 6:
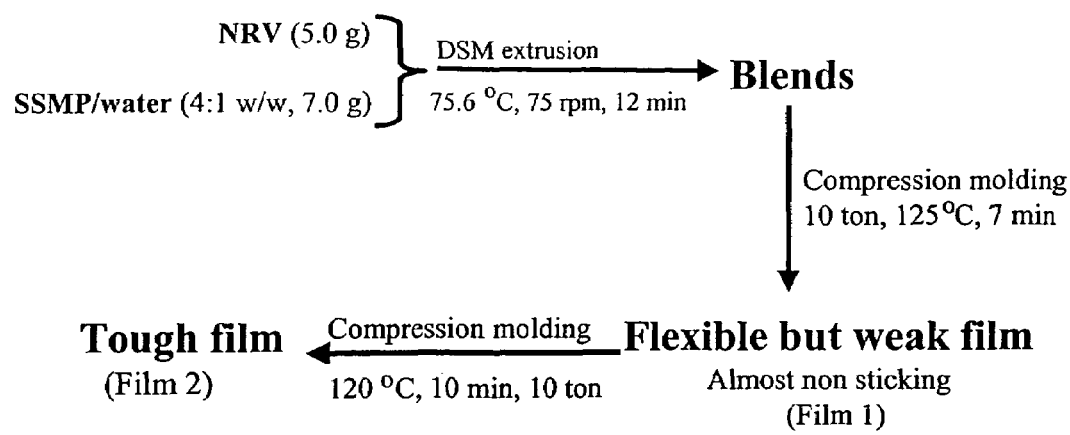
FIG. 6 is a scheme showing the preparation of tough film by a two-step method. Note: NRV—natural rubber/vulcanization compounds premix, its recipe is shown in Table 3; MBT-2-Mercaptobenzothiazole.

Results and discussion: Related method is shown in the scheme of FIG. 6, and the mechanical properties of the Film 1 and Film 2 are shown in Table 4. A weak film was prepared in the first compression molding (the first step) and then the toughness of the film was improved dramatically in the second molding (the second step).

TABLE 4

Film properties prepared by two-steps methods in the scheme of FIG. 6.

| Material | Processing method | Strength at break (MPa) | Elongation at break (%) | Film properties |
|---|---|---|---|---|
| Film 1 | Extrusion blending, molding for vulcanization | 2.2 ± 0.5 | 205 ± 60 | Flexible but weak |
| Film 2 | Re-molding Film 1 | 17 | 87 | Tough |

Conclusion: We successfully prepared tough soy meal/natural rubber materials. The soy meal content in the material was as high as 50%. But the molding-remolding procedure is necessary to prepare this kind of tough material, which increases processing costs.

Example 2

Process Elastic Material with One Step (One Step Method)

As shown in the scheme of FIG. 6 and Example 1, in the first molding, cross-linking degree of the blends was so low that the mechanical properties of the blends were too weak. In the second molding, the cross-linking degree reached at a high level and tough blends were thus obtained. Therefore, cross-linking degree determines whether this material is tough or not. Accelerator types in a normal formulation mainly decide the amount of cross-linking degree. The accelerator we previously used is 2-mercaptobenzothiazole, which has a medium cure rate. On the basis of the above analysis, we selected an accelerator with fast cure rate. It is zinc diethyldithiocarbamate (ZDEC). This accelerator was used to prepare flexible blends by a simple method.

Preparation of NR/Vulcanization Compounds Blends (NRV)

Aim: To disperse vulcanization compounds into NR matrix

Method: NR and vulcanization compounds (VCs) were blended into NR/vulcanization compounds blends (NRV) at 75° C. for 8 min in the DSM extruder with a speed of 20 rpm. In ASTM3184-89, NR and VCs are mixed at 60° C. for 5 min. in a miniature intensive mixer, but the mixing ability of DSM extruder in a given period is weaker than an intensive mixer. Therefore, processing temperature and residence time were increased to 75° C. and 8 min for making VCs dispersed in NR homogeneously. The recipe of NRV is shown in Table 5. This recipe is recommended by two books (Coran, A. Y., In: Chapter 7, Vulcanization, Editors: Mark, J. E.; Erman, B.; Eirich, F. R., Science and Technology of Rubber Academic Press, CA, USA, 1994, p. 352 and Ciesielski, A., An Introduction to Rubber Technology, Publisher: PAPRA Technology Ltd. UK, 2000, p. 32).

TABLE 5

Recipe of NRV (unit: g).

| Name | NR | ZnO | Stearic acid | IPPD | Sulfur | ZDEC |
|---|---|---|---|---|---|---|
| Functions | matrix | activator | activator | anti-oxidant | crosslinker | accelerator |
| Weight | 100 | 5.0 | 2.0 | 2.0 | 2.0 | 1.5 |

Calculating Scorch Time of Un-Cured SSMP/NRV Blends.

Aim: The time lag between application of heat to raw rubber and the beginning of cure (scorch time) is a critical factor for a successful processing (Ciesielski, A., An Introduction to Rubber Technology, Publisher: PAPRA Technology Ltd. UK, 2000, p. 82). Calculating scorch time of un-cured SSMP/NR blends was this experimental aim.

Method: In order to calculate scorch time of un-cured SSMP/NRV blends, SSMP/water (4:1 w/w) and NRV were blended at 75° C. at a motor speed of 20 rpm. The Recipe of un-cured SSMP/NRV blends was shown in Table 6. The torque (N)/time (min) curves of curing reaction (FIG. 7) were recorded by DSM computer system.

TABLE 6

Recipe of un-cured SSMP/NRV blends (unit: g).

| Name | NRV | SSMP/water (4:1 w/w) |
|---|---|---|
| Weight | 5.0 | 7.0 |

Figure 8:
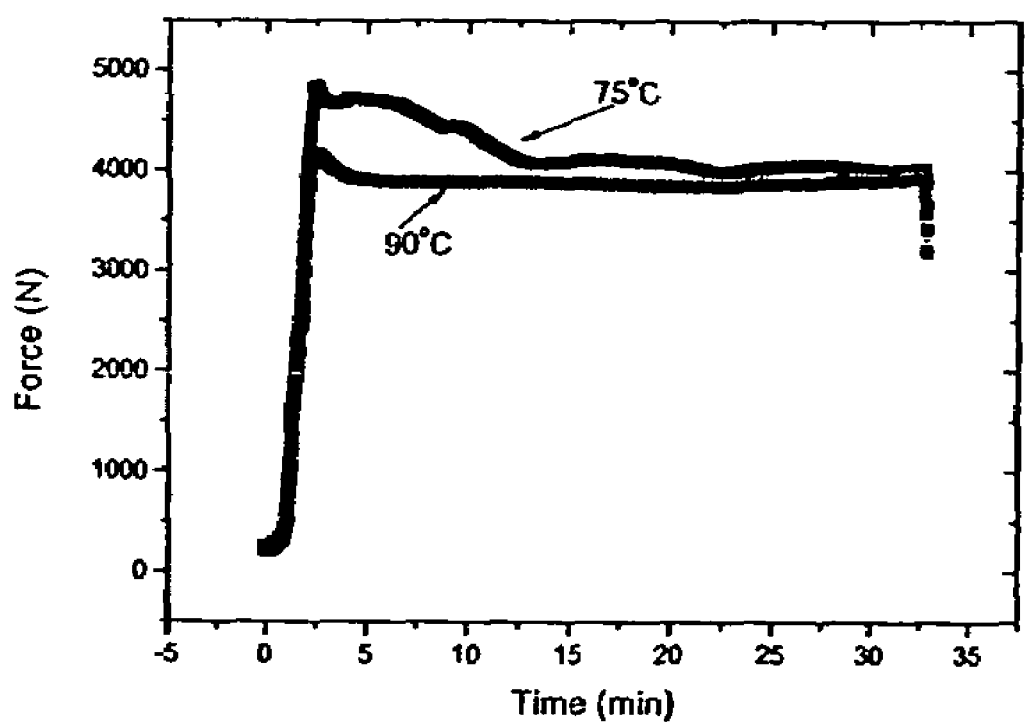
FIG. 8 is a graph showing a determination of scorch time for SSMP/NRV 75° C. and 90° C. by use of N-tert-butyl-2-benzothiazolesulfenamide (TBBS) as an accelerator. Screw speed=20 rpm. The recipe are the same one as shown in Table 5 and 6 except of accelerator.

Results and Discussion: The scorch time at 90° C. is only 3.8 min, which is too short for dispersing SSMP thermoplastic into rubber phase. When mixing time is beyond 3.8 min, mixture in DSM extruder will cross-link quickly and DSM extruder has to stop immediately. There is no processing safety if un-cured SSMP/NRV blends were blended at 90° C. The scorch time at 75° C. was 9.7 min, which is enough for DSM to prepare homogeneous blends. Generally, scorch time can not be too short or too long. There is no processing safety for the blends with too short scorch time. There is a disadvantage for continuously processing for the blends with too long scorch time because blends cannot be quickly vulcanizated after being extruded. Accelerator plays a key role in the vulcanization system. We have tried N-tert-Butyl-2-benzothiazolesulfenamide (TBBS) and 2-Mercaptobenzothiazole (MBT), but no exciting results were obtained. In FIG. 8, the scorch times of TBBS for SSMP/NRV blends both at 75° C. and 90° C. were longer than 33 min, which were too long for continuous processing.

Conclusion: ZDEC was the best accelerator candidate for developing flexible SSMP/NRV blends. We could process SSMP/NRV blends at 75° C. within 9.7 min and cure the blends at 90° C.

Example 3

Preparation of Un-Cured SSMP/NR Blends

Method: 7.0 g of SSMP/water (4:1 w/w) and 5.0 g of NRV were blended in DSM extruder at 75° C. at a motor speed of 20 rpm. 8 min later, melt was extruded through the circle die of the extruder and cut into bars with a dimension of 3.0 mm diameter×100 mm. bars were packaged by aluminum foil separately and stored at 5° C. in a refrigerator.

Preparation of Cured SSMP/NR Blends:

Method: 12 hours later, bars (Un-cured SSMP/NR blends) were taken out of the refrigerator and put into an oven or water bath for vulcanization. Vulcanization temperature is 90° C., time is 20 min. After vulcanization, bars become strong, elastic and non-sticking compared with un-cured bars.

Example 4

Example 4A

Figure 9:
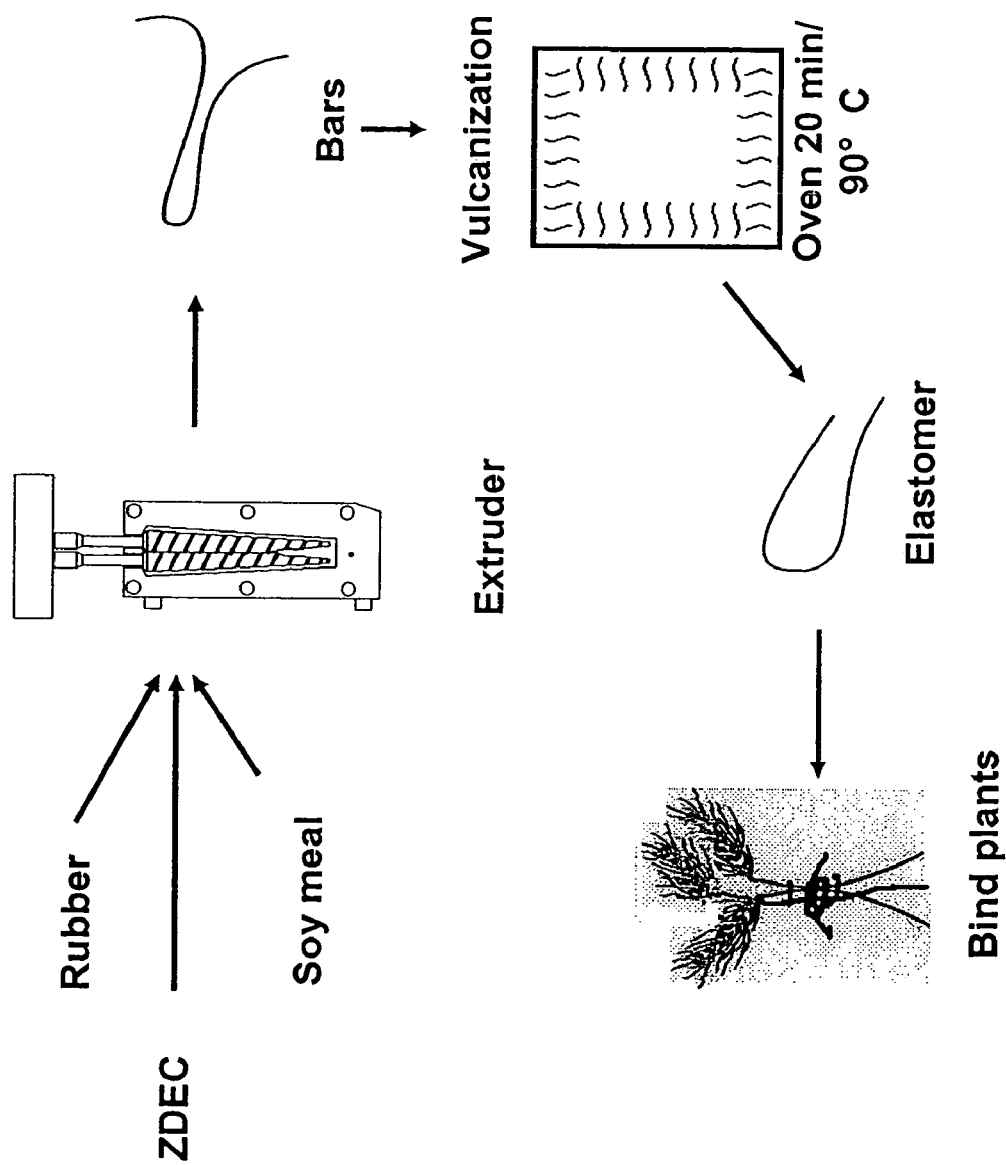
FIG. 9 is a schematic diagram of processing bio-rubber bands of the present invention.

Because the DSM extruder we used was only equipped with a circle die, an example of preparing protein-based rubber bands is shown in the scheme of FIG. 9.

Mechanical properties of our rubber bands and commercial rubber bands are shown in Table 7. Under ambient conditions, our bio-rubber bands were weaker than commercial rubber bands, but became similar as shown in Table 7.

Our bio-rubber bands have the following advantages: (1). Water resistant compared with soy meal; (2). Flexible or elastic under drying condition compared with soy meal; (3). Biodegradable; (4). Much lower in cost compared with polyethylene and commercial rubber bands; (5). Easy to process; (6). Cold resistant; (7). Lack of leaching problem due to that there is no other plasticizers than water in our bands.

Figure 11:
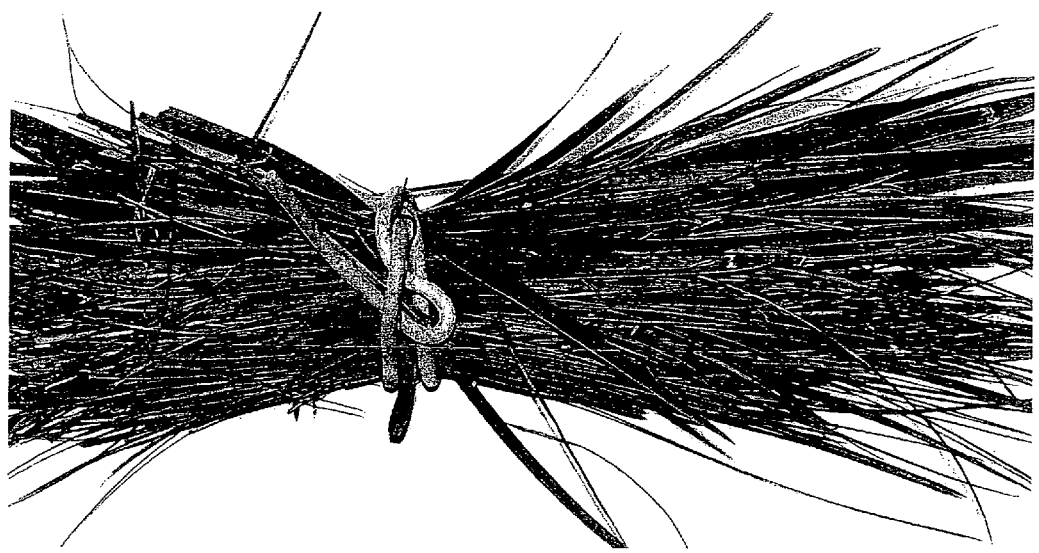

Therefore, our bio-rubber bands can be used for replacing current commercial rubber bands in some applications. It can be used for binding flower and plant in agriculture (FIG. 11).

TABLE 7

Properties of our bio-rubber bands, commercial rubber bands and soy meal bands.

| Name | SSMP a | Water | Ambient$^c$ $\sigma_b$ | $\epsilon_b$ | Dry $\sigma_b$ | $\epsilon_b$ | Wet $\sigma_b$ | $\epsilon_b$ |
|---|---|---|---|---|---|---|---|---|
| Our bio-rubber bands | 51.0 | 6.7 ± 1.2 | 2.8 ± 0.2 | 357 ± 12 | 3.1 ± 0.1 | 399 ± 7 | 3.6 ± 0.8 | 478 ± 50 |
| Commercial Rubber bands | 0 | 1.1 ± 0.1 | 4.4 ± 0.5 | 396 ± 11 | 3.0 ± 0.3 | 381 ± 28 | 3.6 ± 0.2 | 456 ± 34 |
| Soy meal bands | 100 | 61.9 ± 3.5 | 7.0 ± 1.0 | 2.9 ± 0.4 | brittle | brittle | broken | broken | a 12 g of SSMP/NRV blends contained 5.0 g of NRV and 7.0 g of SSMP/water (4:1). The moisture content of raw SSMP is 7.5 wt %. 7.0 g of SSMP SSMP/water (4:1) contained 1.82 g water and 5.18 g dry SSMP. Therefore, SSMP content in dry polymers is dry SSMP/(NRV + dry SSMP) × 100% = 5.18/(5.0 + 5.18) × 100% = 51.0 wt %.

Figure 12:
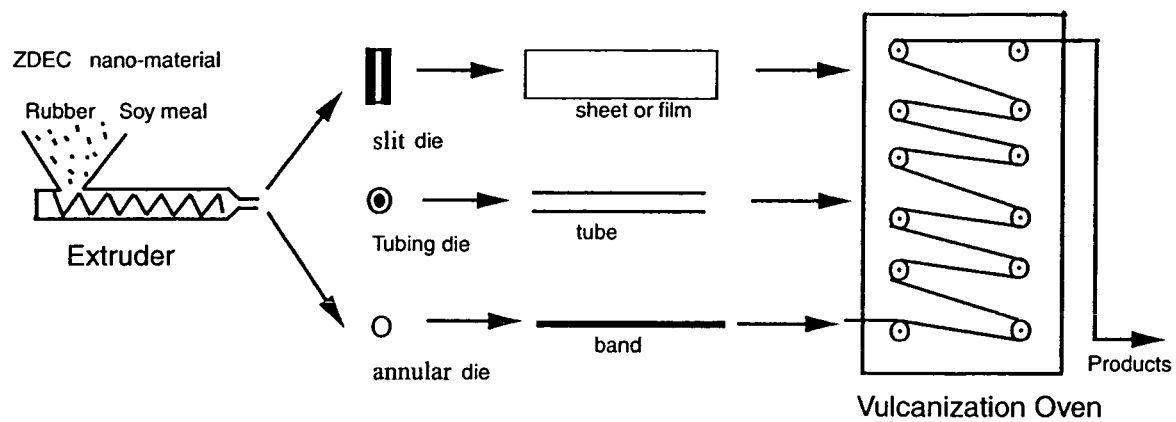
FIG. 12 is a scheme showing the preparation of sheet, film, tube and band by use of an industrial extruder.

If the die of the micro-extruder in the scheme of FIG. 9 is changed into flat or tubing one, sheet, films or tubes can be easily produced by use of our soy meal/natural rubber blends. Therefore, our products are not limited to bio-rubber bands, bio-rubber sheet, film and tube also can be produced as shown in the scheme of FIG. 12.

Example 4B

The strength of our soy/bio-rubber bands (2.8 MPa) is weaker than that of commercial one (4.4 MPa). Rubber-based material has high heating resistance and the heating conduction ability of air in an oven is weak. This leads to the temperature of samples could not equilibrate as quickly as possible at 90° C. within 20 min, resulting in low cross-linking degree because the actual heating period of samples is much shorter than 20 min. Liquid has much better heating conduction ability than air, so in this example, water is used to heat sample to improve the mechanical properties of samples.

Figure 13:
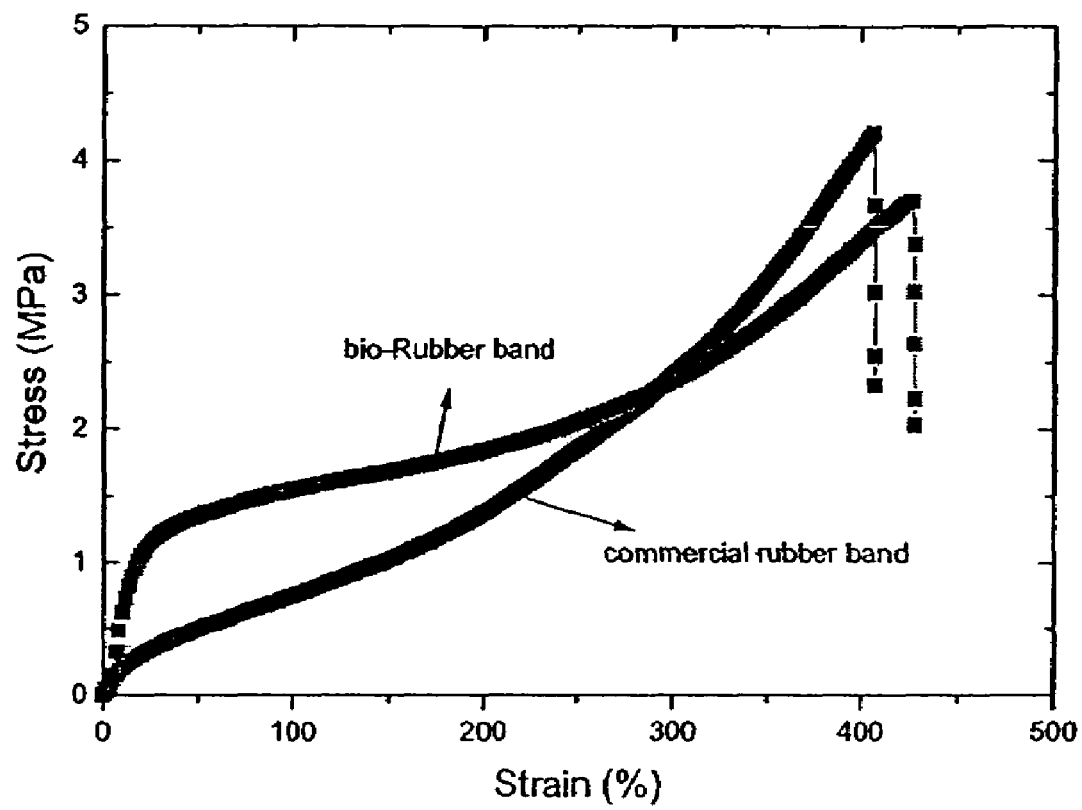
FIG. 13 is a graph showing stress/strain curves of the soy meal-based rubber band cured in a water bath at 90° C. for 20 min, and then stored at ambient conditions for 4 h, and commercial rubber bands.

Un-cured bars were taken out from a refrigerator and vulcanized in a water bath with a temperature of 90° C. 20 min later, bars were removed from the water bath and a soft napkin was used to dry the cured bars. The stress/stain curves of the cured bars (bands) and commercial rubber bands are shown in FIG. 13. The mechanical properties of soy/bio-rubber bands cured in a water bath, soy/bio-rubber bands cured in an oven and commercial rubber bands are shown in Table 8.

TABLE 8

Properties of our bio-rubber bands,
commercial rubber bands and soy meal bands

| Names | $\sigma b$ a<br>MPa | $\varepsilon b$<br>% |
|---|---|---|
| Our soy/bio-rubber bands cured in a | 4.1 ± 0.5 | 420 ± 9 |
| Our soy/bio-rubber bands cured in an | 2.8 ± 0.2 | 357 ± 12 |
| Commercial Rubber bands | 4.4 ± 0.5 | 396 ± 11 | a samples were stored at ambient condition.
bcuring conditions: 90° C. and 20 min.

As shown in FIG. 13, the toughness of our soy/bio-rubber bands is similar with that of commercial rubber bands. The mechanical properties of our soy/bio-rubber bands cured in a water bath became better than that of one cured in an oven, thereby showing very similar properties with that of commercial rubber bands.

TABLE 9

Biodegradability in theory of our soy/bio-rubber bands.

| Components | Weight Content (%) a | Mechanism of biodegradability | Biodegradability type |
|---|---|---|---|
| SSMP | 51.0 | Food for microorganisms | Directly biodegradable |
| NR | 39.3 | Environmentally degraded by oxygen, ozone etc into fractions, then degraded by microorganism | First disposable and then biodegradable |
| Additives (ZnO, etc) | 9.7 | Food for microorganisms | Directly biodegradable | a 12 g of SSMP/NRV blends contained 5.0 g of NRV and 7.0 g of SSMP/water (4:1). The moisture content of raw SSMP is 7.5 wt %. 7.0 g of SSMP SSMP/water (4:1) contained 1.82 g water and 5.18 g dry SSMP. Therefore, SSMP content in dry blends is dry SSMP/(NRV + dry SSMP) × 100% = 5.18/(5.0 + 5.18) × 100% = 51.0 wt %. The percentage of natural rubber in NRV is 100/125 × 100% = 80% (Table 5), the content of natural rubber in dry blends is NR/(NRV + dry SSMP) × 100% = (5.0 × 80%)/(5.0 + 5.18) = 39.3%.

Discussion of the biodegradability of our bio-rubber bands: We did not test the biodegradability of our soy/bio-rubber bands, so there is no data as evidence. But we can predict the possible biodegradability of the product on the basis of existed knowledge. The biodegradability information in theory of our soy/bio-rubber bands is shown in Table 9. As it known, SSMP is a kind of food for microorganism, so this component will be biodegraded directly. There are many double bonds in NR macromolecular chains that are easy to be attacked and degraded by oxygen, ozone and water. When the molecular weight of the environmentally degraded NR is lower enough, microorganisms will start to use the NR fragments as food. Obviously, the biodegradability of cross-linked NR is depending on cross-linking degree. Tires in the car industry are difficult to degrade because of too high cross-linking degree and the existence of much amount of anti-microorganism additives. Commercial rubber bands are possible to degrade because of low cross-linking degree. If commercial rubber bands are stored in ambient conditions for 1-2 years, it will be sticky and lose its strength because of environmentally degradation. According to the elastic properties of our soy/bio-rubber bands, the cross-linking degree should be low enough for biodegradation.

Leaching Phenomenon of Protein-Based Polymers

After equilibration at 100% RH for 24 h, there was no leaching problem on the surface of the bio-rubber bands. But both sorbitol-plasticized SSMP film and glycerol-plasticized SPI film showed serious leaching problem. In most prior art patents, plasticizers with high boiling temperature, such as glycerol or polyol, incorporated into pure protein plastics (U.S. Pat. Nos. 5,710,190; 5,523,293 and 5,397,834 to Jane et al) or protein/synthetic polymer blends (U.S. Pat. No. 6,632,925 to Zhang et al). But the leaching problem has not been given much attention in these publications.

The present invention shows:

(1). The result that use of water as a plasticizer to prepare SSMP thermoplastic which has no leaching problem. In the available patents (U.S. Pat. No. 6,632,925 to Zhang et al; U.S. Pat. Nos. 5,710,190; 5,523,293 and 5,397,834 all to Jane et al) related to soy protein-based plastics, much amount of glycerol was used.

(2). Extrusion conditions of SSMP/water: SSMP/water from 90/10 to 70/30 w/w; temperature from 50 to 120° C. If SSMP is processed at high temperature, it will degrade and became black; and processing will became difficult because of the evaporation of water. In the available patents (U.S. Pat. No. 6,632,925 to Zhang et al; U.S. Pat. Nos. 5,710,190; 5,523,293 and 5,397,834 all to Jane et al) related to soy protein-based plastics, processing temperature is high than 120° C., which will lead to degradation of protein.

(3). Use low cost SM to prepare biodegradable and flexible SSMP/NR blends. In the available patents (U.S. Pat. No. 6,632,925 to Zhang et al; U.S. Pat. Nos. 5,710,190; 5,523,293 and 5,397,834 all to Jane et al) related to soy protein-based plastics, in the "Examples" section, only soy protein isolate is used because soy protein isolate has much better processability than soy meal.

(4). Use ZDEC to vulcanize SSMP/NR to improve the toughness of the blends. ZDEC makes continuous processing possible because of its proper scorch time.

(5). SSMP content reached at a high level in blends. In the available patents (U.S. Pat. No. 6,632,925 to Zhang et al; U.S. Pat. Nos. 5,710,190; 5,523,293 and 5,397,834 all to Jane et al) related to soy protein-based plastics, dry soy protein content in dry polymers cannot reach at 50% or higher under the condition of good mechanical properties.

(6). Use a two-step method to prepare tough film. The strength of the prepared film was improved dramatically. Use to one-step method to continuously extrude SSMP/NR blend.

To prepare low cost, biodegradable, and elastic soy protein-based materials from the byproducts of the soy oil industry, soy meal particles were purified to prepare separated soy meal powder (SSMP). Then, the amount of water and extrusion temperature were optimized to improve the processability of SSMP. Finally, natural rubber and vulcanization compounds were blended with SSMP to prepare flexible blends. Results showed that wind blowing was a cheap and effective method to prepare SSMP. The processability of SSMP was obviously improved if incorporated water content was 20 wt % and extrusion temperature was 100° C. After vulcanization, SSMP/NR blends containing 51 wt % SSMP remained elastic (strength at break: 2.8-4.1 MPa, elongation at break: 350-540%) even after drying at 54° C. for 24 h or immersion in water for 24 hours. There was no leaching problem because there is no plasticizer other than water in the blends. The blends can be shaped into bands, film, sheet and tubes. A bio-rubber band was prepared as a product, which showed similar mechanical properties to those of commercial rubber bands (strength at break: 3.0-4.4 MPa, elongation at break:

396-456%). It is feasible to produce the bio-rubber bands, sheet and film on a large scale.

The relationship between material properties and processability of the novel soy meal/natural rubber blends were discussed. In the first stage, to decrease the cost of raw material, SM was used. But SM is impure and has poor processability due to the presence of hulls and cellulose fibers. It is necessary to cheaply and efficiently remove these impurities from SM to prepare separated soy meal powder (SSMP). In the second stage, to smoothly extrude the SSMP in an extruder, optimal water content and temperature range were determined. In the third stage, NR was blended with SSMP and vulcanized to prepare SSMP-rich material that has good flexibility even after drying and has promising water resistance. Because there is no plasticizer other than water in the SSMP matrix, the SSMP/NR blend has no leaching problem.

TABLE 10

Particle size distribution of soy meal

| Particle size, µm | wt % of sample |
|---|---|
| ≧2000 | 25.6 |
| 1680-2000 | 13.1 |
| 840-1680 | 56.9 |
| ≦840 | 4.4 |

Example 5

Experimental

Material: Natural rubber (SMR-CV60) was obtained from Harwick Standard Distribution Corporation, Akron, Ohio. Soy meal (7.5±0.7 wt % of moisture) was obtained from the Michigan Soybean Promotion Committee, Frankenmuth, Mich. The particle size distribution of the soy meal is shown in Table 10. N-isopropyl-N'-phenylparaphenylenediamine (IPPD, SANTOFLEX® IPPD-PST-6MM) and zinc diethyldithiocarbamate (PERKACIT® ZDEC-PDR) were obtained from Flexsys company, Akron, Ohio.; stearic acid (95%) and sorbitol (industry grade) were purchased from Aldrich, St. Louis, Mo. Zinc oxide (ZnO, 99.0%, powder) and sulfur (sublimed powder) were purchased from Columbus Chemical Industries Inc., Columbus, Wis. and commercial rubber bands (size #33, Officemax®,) from Officemax Inc, Shaker Heights, Ohio.

Preparation of Separated Soy Meal Powder (SSMP)

In order to purify soy meal, a wind-blowing method was used. This method is shown in the scheme of FIGS. 1 and 2. The impurities were generally lighter than purified SM particles, so the SM particle flow was separated in wind into two fractions: purified SM and impurities. The purified SM was collected and separated again. The wind was produced from a hair drier (HIGHENERGY® 1250, Conair Corp., Edison, N.J.). The two fractions were milled in a mill (Cyclone Sample Mill, UDY Corporation, CO, USA) with a 297 µm screen mesh. The purified and milled SM, denoted SSMP, was a fine powder.

Preparation of Film by Compression-Molding

Samples (3 g) were covered with Teflon films on both sides and placed between two steel plates. The steel plates were placed in a hot press (Carver Laboratory Press, Model M, Fred S. Carver Inc, Menomonee, Wis.) at 125° C., and compression-molded at 1 ton for 1 min. Next, the pressure was quickly increased to 15 ton. After 8 min, the mold was cooled to below 40° C. by a water-cooling system at a rate of 10° C./min. A yellow transparent film with a thickness of 0.2 mm was released from the mold, and stored in a polyethylene bag.

Improvement of Processability of SSMP Thermoplastic

Figure 14:
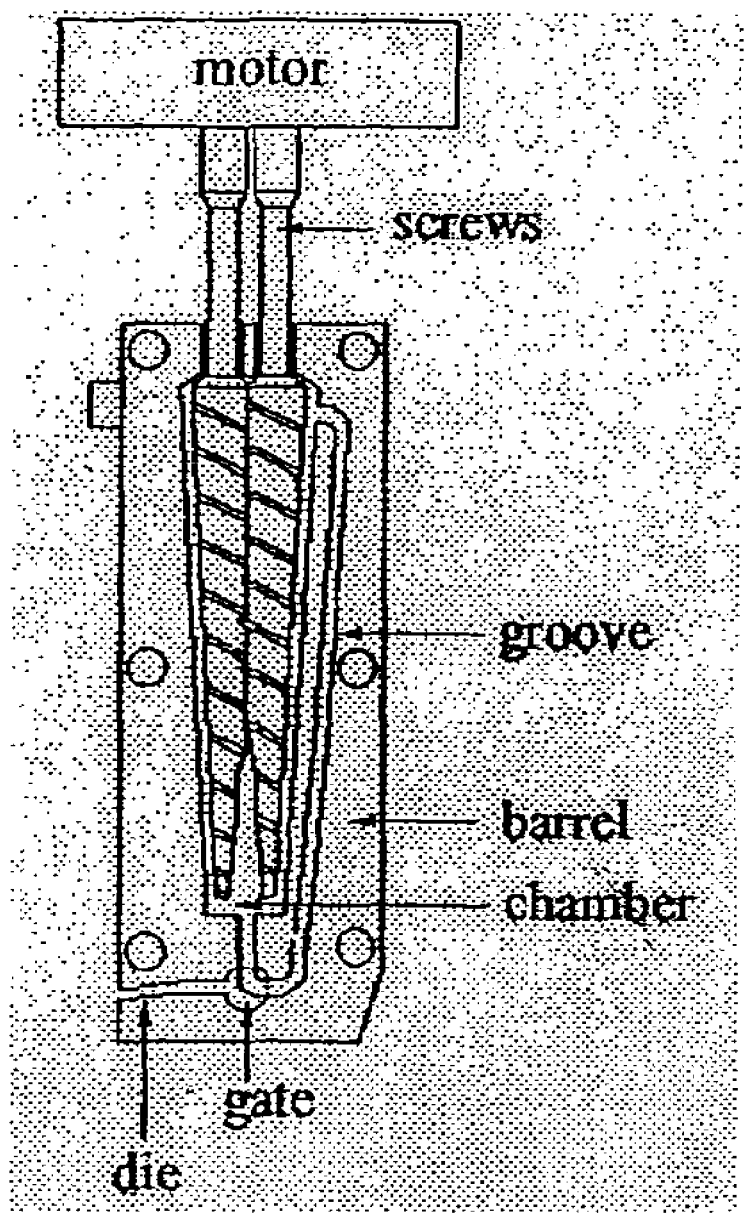
FIG. 14 is a sectional view of the DSM extruder. When the gate is closed, the screws pump the melt from the chamber via the gate, through the groove and back to the chamber again; when the gate is open, the screws pump the melt from the chamber via the gate, through the die and out of the extruder; the feed amount is 10-12 g per experiment.

Raw SSMP is difficult to extrude. It is necessary to add water and use proper extrusion temperatures, to make SSMP easy to extrude. Glycerol or sorbitol will not be added into SSMP thermoplastic because they will cause leaching problems. The method used in the current study is described as follows: SSMP and water were mixed in a high-speed blender (Waring Commerical Blender, model 34BL92, Dynamics Corporation of America, New Hartford, Conn., USA) for 1 minute to prepare premix. The premix (12 g) was fed into a micro-twin extruder (15 cm$^3$ in volume capacity, DSM Research, Netherlands) to prepare the thermoplastic. A diagram of the DSM extruder is shown in FIG. 14. The extrusion speed was kept constant at 20 rpm in this study unless indicated. The extrusion force was recorded, the extrusion force (N)/time (min) curves were used to evaluate the processability of SSMP/water mixtures. The morphology of the extrudates was also inspected. First SSMP with various incorporated water contents (10%, 20% and 30%) was fed into the DSM extruder and mixed at 100 for 25 min to obtain extrusion force/time curves. Incorporated water content was optimized in this step using the extrusion force/time curves. Next, SSMP with optimal incorporated water content was mixed at 80° C., 90° C., 100° C., 110° C., 120 and 150. Extrusion force/time curves at different processing temperatures were recorded to determine the acceptable or optimal processing temperature range. The optimized extrusion conditions were used for blending SSMP/NR.

Preparation of Flexible SSMP/NR Blends

SSMP/NR blends are sticky and weak. Vulcanization is necessary to prepare commercially valuable products from SSMP/NR blends. The detailed methods are as follows:

(1) Preparation of NR/vulcanization compound blends (NRV): To disperse vulcanization compounds into the NR matrix, NR and vulcanization compounds (VCs) were blended at 75 for 8 min in the DSM extruder to prepare NRV. In ASTM3184-89, NR and VCs are mixed at 60° C. for 5 min. in a miniature intensive mixer, but the mixing ability of the DSM extruder is less than an intensive mixer. Therefore, the processing temperature and residence time were increased. The recipe for NRV is shown in Table 11.

TABLE 11

Recipe for NRV

| Name | Function | Weight (g) |
|---|---|---|
| NR | matrix | 100 |
| ZnO | activator | 5.0 |
| Stearic acid | activator | 2.0 |
| IPPD | antioxidant | 2.0 |
| sulfur | cross-linker | 2.0 |
| ZDEC | accelerator | 1.5 |

(2) Calculating scorch time of un-cured SSMP/NRV blends: The time lag between application of heat to rubber and the beginning of cure (scorch time) is a critical factor for successful processing (An Introduction to Rubber Technology; Ciesielski, A., Ed.; PAPRA Technology Ltd.: UK, 2000; p. 82). In order to calculate the scorch time of un-cured SSMP/NRV blends, the sample was blended at 75 and 90. The weight ratio of SSMP/water (80/20 w/w) to NRV blends was kept constant at 7.0/5.0 (g/g) in this study unless otherwise specified. Extrusion torque (N)/time (min) curves of mixing were recorded by the DSM computer system.

(3). Preparation of uncured SSMP/NRV blends: SSMP/W (80/20, 7.0 g) and NRV (5.0 g) were blended in the DSM extruder at 75° C. 6 min later, melt was extruded through the circular die of the extruder and cut into bars with dimensions of 3.0 mm diameter×100 mm. The bars were packaged separately in aluminum foil and stored at 5° C. in a refrigerator. The uncured SSMP/NRV blends was coded as SSMP-NRV-70:50-U, in which "70:50" stands for the weigh ratio of SSMP/water (80:20) to NRV and 'U' represents "un-cured". SSMP-NRV-70:50-U is a thermoplastic which can be shaped into various articles such as bands, sheet, film, tubes, etc.

hydroxyl sodium and hydrochloric acid aqueous solution. Then the SPI precipitate is dried to prepare powder (Soy protein products: characteristics, nutritional aspects, and utilization; Endres, J. G., Ed.; AOCS Press: IL, USA, 2001). SPI shows higher strength than SM, but is expensive because a large amount of chemicals, water and energy are used in the purification process. Obviously, it is cheap and effective to separate SM by the wind-blowing method. It should be noted that the method employed in this study, while effective, is crude. A commercial process would use one of a variety of readily available classification systems (Wright, D. J.; Bumstead, M. R.; Chan, H. W., S. J. Food Sci. Agric. 1984, 35, 531) and (Sessa, D. J., J. Food Sci. Agric. 2004, 84, 75).

Improvement of Processability of SSMP Thermoplastic

TABLE 12

Effects of incorporated water content on the processability of SSMP thermoplastic. Note: temperature is 100° C. and motor speed is 20 rpm. Water content in this work is the percentage of water by weight added into SSMP.

| Samples | Incorporated water content (%) | Average force (N) a | Maximum force (N) a | Extrudate surface | Mechanical properties |
|---|---|---|---|---|---|
| SSMP/W (70/30) | 30 | 1400 | 1523 | Smooth/yellow | Weak |
| SSMP/W (80/20) | 20 | 2970 | 3019 | Smooth/yellow | Strong/flexible |
| SSMP/W (90/10) | 10 | 6600 | 7500 | Coarse/yellow | Stiff | a extrusion force displayed by the DSM extruder.

SSMP-NRV-70:50-U (36 g) was shaped into a band with the dimensions of 3.0 mm (diameter)×3 m (length)

(4). Preparation of cured SSMP/NR blends: 24 h later, SSMP-NRV-70:50-U was taken out of the refrigerator and put into an oven or water bath for vulcanization. Vulcanization temperature was 90° C. and time was 20 min. Cured SSMP/NR bars were coded as SSMP-NRV-70:50-C. Bands made from this material are referred to as "bio-rubber bands".

Evaluating purity of SSMP: In order to investigate the purity of the each fraction as shown in the scheme of FIG. 1. Each fraction was first mixed with sorbitol (15 wt %) and water (15 wt %) in the Waring Commerical blender for 30 seconds to prepare a premix. The premix was compression-molded into film. The transparency of the film was inspected by use of a digital camera (FinePix 4500, Fuji Photo Co. LTD, Japan) to evaluate the purity of the film. If film from the soy meal fraction is transparent by vision inspection and satisfies with general packaging, this soy meal fraction is considered as purified soy meal; or else, as impurities. The premixture was also extruded in the DSM extruder to evaluate the processability of the fractions.

Results and Discussion

Preparation of separated soy meal powder (SSMP): The percentages of purified SM and impurities were 87.2 wt % and 12.8 wt %, respectively. The premixture from purified SM was easy to extrude but that from the impurities fraction was difficult. The extruder often stopped automatically because of excessive torque force. The impurities fraction was inspected by vision and appeared to be composed of hulls, cellulose fibers and other foreign material. The processing properties were rather poor. Images of films from the two fractionations are shown in FIGS. 3 and 4. There were many particles that could not be melted in the impurities fraction, but only a few in the SSMP fraction. If a machine is used to separate SM automatically and repeatedly, it is expected that the SSMP will become successfully pure. To prepare soy protein isolate from soy meal, soy meal is treated with The effects of incorporated water content on the processability of SSMP thermoplastic are shown in Table 12. Too much water was a disadvantage for product properties, while too low an amount of water in SSMP led to an excessively high viscosity for processing. Rubber melt has a high viscosity when being processed, so the SSMP/water mixture should have a low enough melt viscosity in order to process the SSMP/NR smoothly. On the basis of the above considerations, 20 wt % of water should be incorporated into SSMP to make extrusion smooth.

TABLE 13

Effects of temperature on the processability of SSMP thermoplastic. Note: sample is SSMP/W (80/20) and motor speed is 20 rpm.

| Temperature ° C. | Average force | Extrudate surface | Mechanical properties |
|---|---|---|---|
| 80 | 3500 | Coarse/yellow | Weak |
| 90 | 3100 | Smooth/yellow | Weak |
| 100 | 2950 | Smooth/yellow | Weak |
| 110 | 2800-7000 | Smooth/yellow | Somewhat stiff |
| 120 | 4500-7000 | Smooth/black | Somewhat stiff |
| 150 | >7000 | Coarse/black | Stiff |

Processing temperature dramatically affected processability of SSMP thermoplastic, as shown in Table 13. Too high a processing temperature (150° C.) caused water to evaporate and melt viscosity to increase. Low temperature resulted in poor mobility of the polymer, also leading to higher extrusion forces (3500 N at 80). When barrel temperature was equal to or higher than 110° C., water evaporated quickly and extrusion force increased with increasing extrusion time as shown in FIG. 5. Because of degradation, the extrudate became black in color after the sample was processed at 120 for 6 min or 150 for 30 seconds. When the sample was processed in the extruder at 150 for 30 seconds, the extruder stopped due to high melt viscosity. As shown in FIG. 5, extrusion forces of samples processed at temperatures above 100 were sensitive to extrusion time (residence time), but the extrusion force remained constant when processing temperature was equal to or under 100. It can be concluded that an acceptable extruding temperature for SSMP/W (80/20) is 80-100° C., and the optimal processing temperature is 100° C.

Figure 15:
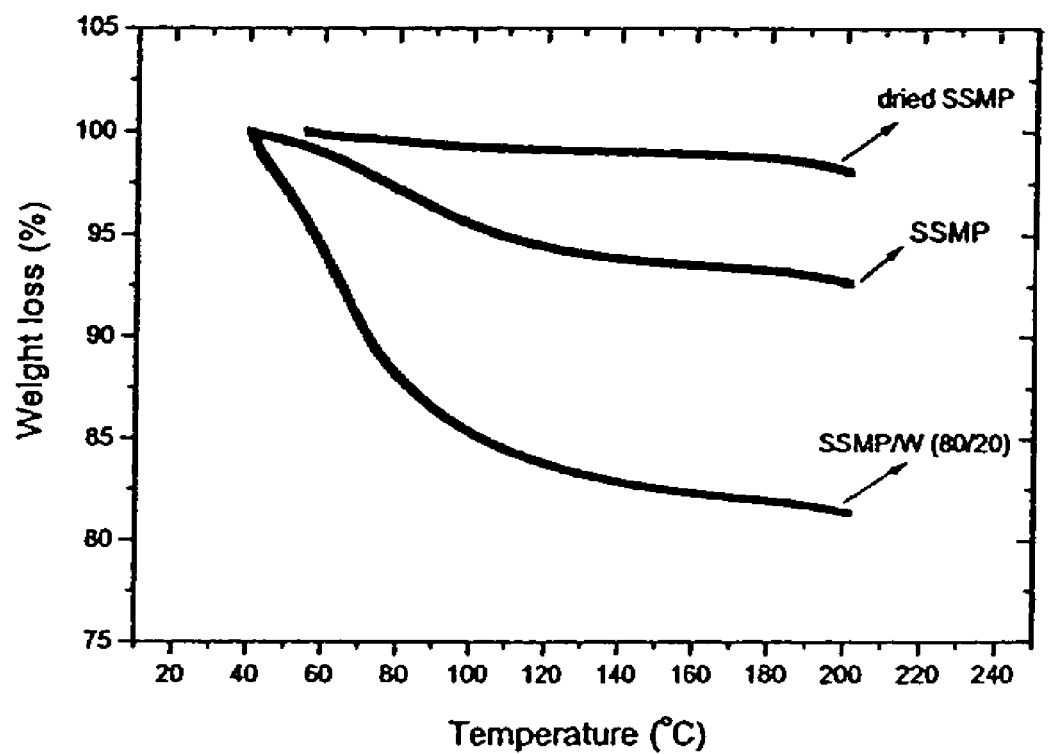
FIG. 15 is a graph showing TGA thermograms of dried SSMP, SSMP and SSMP/W (80/20) samples. Dried SSMP: SSMP was dried at 80° C., 1 mmHg for 10 h and then stored in a desiccator containing $CaSO_4$.

TGA thermograms of dried samples of SSMP, SSMP and SSMP/W (80/20) are shown in FIG. 15. Because the processing temperature of SSMP in practice is below 200° C., the scanning temperature range of TGA in FIG. 15 was from ambient temperature to 200° C. Even when SSMP was dried at 80, 1 mmHg for 10 h (FIG. 15, dried SSMP), it still absorbed about 1 wt % moisture during storage and handling. The weight loss of both SSMP and SSMP/W (80/20) was significantly dependent on extruding temperatures from 30-120 but after 120° C., this trend declined. This implies that water was completely evaporated after 120° C. Therefore, the optimal processing temperature should be equal to or below 100° C. to avoid obvious weight loss of water in processing. Concomitant with the complete loss in water content, the extrusion force increased sharply when SSMP/W (80/20) was extruded at 120° C., as shown in FIG. 6. SSMP started to become black in color as shown in Table 13, indicating thermal degradation. FIG. 15 shows no obvious degradation reaction for dried SSMP. These results implied that the time-temperature history is significantly less severe in the TGA test than in extrusion.

Preparation of Flexible SSMP/NR Blends

The formulation of vulcanization compounds used in this work is shown in Table 11. This is a typical formulation for accelerated sulfur vulcanization systems (An Introduction to Rubber Technology; Ciesielski, A., Ed.; PAPRA Technology Ltd.: UK, 2000; p. 82) and (Coran, A. Y., Vulcanization. In Science and Technology of Rubber; Mark, J. E.; Erman, B.; Eirich, F. R., Eds.; Academic Press: CA, 1994; pp. 350-352). When the sulfur content is larger than 2.0 g/100 g NR, sulfur will blossom on the surface of the sample, and when the ZDEC content is larger than 2.0 g/100 g NR, there are odor problems. Hence, the contents of sulfur and ZDEC were selected as 2.0 g/100 g NR, and 1.5 g/100 g NR, respectively. This is a Semi-Efficient Vulcanization (EV) system (Bhowmick, A. K.; Mangaraj, D., Vulcanization and curing techniques. In Rubber Products Manufacturing Technology; Bhowmick, A. K.; Hall, M. M.; Benarey, H. A., Eds.; Marcel Dekker Inc.: New York, 1994; pp. 320-340).

Figure 7:
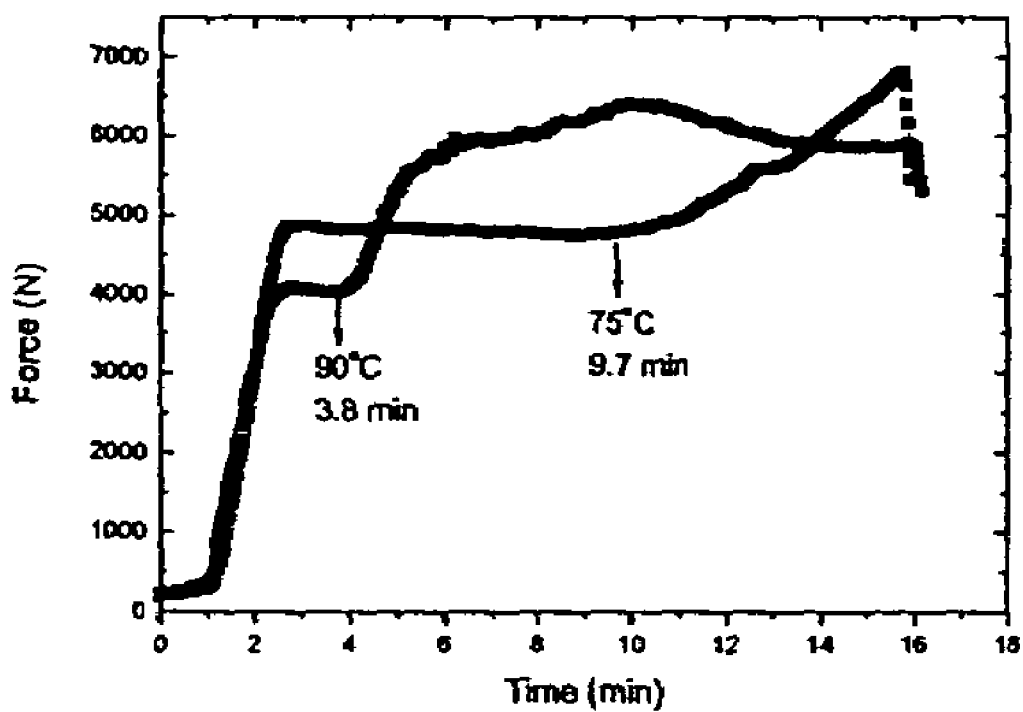
FIG. 7 is a graph showing a determination of scorch time of SSMP/NRV blends at 75° C. and 90° C. with a motor speed of 20 rpm, respectively.

In this work, the SSMP/NRV premix was mixed in the DSM extruder, and screw torque as a function of time was recorded to calculate scorch time. This is a kind of on-line measurement which is little different from a standard method described in ASTM D2084-88, in which the sample is not mixed but is in static state in a cavity. Therefore, the method using the DSM extruder is more useful than the standard one for simulating the extrusion situation. As shown in FIG. 7, the scorch time of SSMP-NRV-70:50-U at 90 was only 3.8 min, which is too short for dispersing SSMP thermoplastic into the rubber phase. When the mixing time was beyond 3.8 min, the mixture in the DSM extruder would cross-link quickly and the DSM extruder had to stop immediately. There was no processing safety if uncured SSMP/NRV blends were blended at 90. The scorch time at 75 was 9.7 min, which is enough for the preparation of homogeneous blends. Generally, scorch time cannot be too short or too long. There is no processing safety for the blends with too short scorch time. There is a disadvantage for continuous processing for the blends with too long a scorch time because blends can not be quickly vulcanized after being extruded. The accelerator plays a key role in the vulcanization system. At present, there are four main types of accelerators: benzothiazole, benzothiazolesulfenamides, dithiocarbamates and amines (Coran, A. Y., Vulcanization. In Science and Technology of Rubber; Mark, J. E.; Erman, B.; Eirich, F. R., Eds.; Academic Press: CA, 1994; pp. 350-352). In these accelerators, we first tried 2-Mercaptobenzothiazole (MBT) and N-tert-Butyl-2-benzothiazolesulfenamide (TBBS), which are common accelerators in the rubber industry, but the scorch times both at 70° C. and 90, respectively, were longer than 35 min (curves are not shown), which were too long for a continuous extrusion process. Therefore, we tried dithiocarbamate type accelerators which have the fastest curing rate and shortest scorch time among the current accelerators (Coran, A. Y., Vulcanization. In Science and Technology of Rubber; Mark, J. E.; Erman, B.; Eirich, F. R., Eds.; Academic Press: CA, 1994; pp. 350-352). Among the dithiocarbamate type accelerators, ZDEC gave better results than tetramethylthiuram disulfide (TMTD) in this study. In summary, SSMP/NRV blends could be extruded at 75° C. within 9.7 min, and the extrudates could be cured at 90° C. However, more details study could be done on the selection of accelerators.

Figure 16:
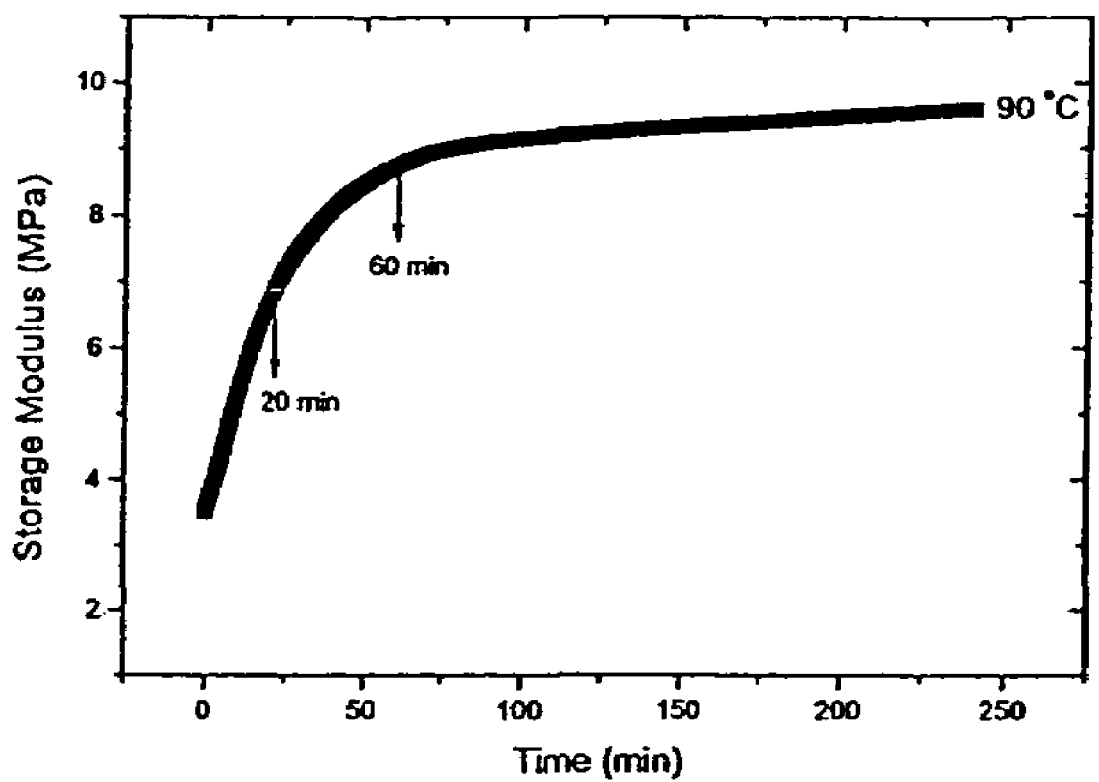
FIG. 16 is a graph showing the effects of curing time on storage modulus of the uncured soy meal-based rubber bands.

In order to determine the effect of curing time on the mechanical properties of SSMP-NRV-70:50-C, DMA was used to monitor the curing reaction as shown in FIG. 16.

There is a direct relationship between the small strain modulus and the crosslink density for rubber (Bhowmick, et al ibid). Therefore, the state of cure can be monitored by use of DMA in isothermal mode. In FIG. 16, the storage modulus of the sample increased quickly in the first 60 min but slowly after 60 min. The storage modulus increased to 55.9% of its final value. Increasing the curing time to 60 min. is beneficial to increasing toughness but this will increase processing cost. To prepare a tough sample, one strategy is to optimize the vulcanization formulation, which will be done in future work. Another strategy is first to cure samples at 90° C. for 20 min., and then continue to cure at ambient conditions, since the sample has an ability to cure slowly at ambient conditions. Film from SSMP thermoplastic was brittle and film from NRV without SSMP was weak in strength ($\sigma b=0.47$), so these two samples failed during DMA measurement in the tension mode.

Mechanical properties of SSMP-NRV-70:50-C vulcanized in an oven at 90° C. for 20 min., are shown in Table 14. Commercial rubber bands (Officemax®) and SSMP thermoplastic from SSMP/W (80/20) were used as controls. Fresh SSMP thermoplastic tended to become brittle at ambient conditions because of the loss of water. This made the thermoplastic broken when tightened in the clamps of the Instron tensile tester. Accordingly, fresh SSMP thermoplastic was stored in a sealed glass bottle and the bottle was placed in a refrigerator at 5° C. to avoid the growth of microorganisms. Even under these storage conditions, SSMP thermoplastic also showed a little brittleness ($\epsilon b=2.9\%$). When dried in an oven, SSMP thermoplastic was too brittle to test. When immersed in water for 24 h, SSMP thermoplastic absorbed 61.9% water, which resulted in failure for the tensile test. These results indicate that SSMP thermoplastic is rather limited in use. At ambient conditions, commercial rubber bands showed better mechanical properties than SSMP-NRV-70:50-C, but after drying at 54° C. for 24 h, $\sigma b$ and $\epsilon b$ of commercial rubber bands decreased to 3.0 MPa and 381%, respectively, due to thermal degradation. After immersion in water, the commercial rubber bands absorbed 1.1% water and became more elastic compared with those stored at ambient conditions. SSMP-NRV-70:50-C after drying showed better mechanical properties than at ambient conditions because the material was still actively in cross-linking reaction during drying (54° C., 24 h). Both σb and εb of SSMP-NRV-70:50-C immersed in water for 24 h increased, compared with this values for samples at ambient conditions. This is an adverse phenomenon because the mechanical properties of wetted samples should become worse. A possible explanation was that: before immersion in water, vulcanization compounds such as stearic acid, ZDEC etc., were heterogeneously distributed in the hydrophobic NR matrix. Especially for ZDEC, it is water soluble and high hydrophilic. It would exist in the NR matrix in the form of micro-particles. When SSMP-NRV-70:50-C was immersed in water, water would penetrate the NR matrix slowly, dissolve the hydrophilic micro-particles and redistribute them. The re-distribution would make ZDEC has more chances to interact with hydrophobic sulfur. This would trigger new cross-linking reactions, resulting in improvement in the mechanical properties of SSMP-NRV-70:50-C. Water is beneficial for ZDEC to accelerate vulcanization reaction. In the natural rubber glove industry, ZDEC is often used to speed up the curing of aqueous latex in products (Gorton, R., Latex product manufacturing technology. In Rubber Products Manufacturing Technology; Bhowmick, A. K.; Hall, M. M.; Benarey, H. A., Eds.; Marcel Dekker Inc.: New York, 1994; pp. 823).

After curing at 90° C. for 90 min, σb and εb of SSMP-NRV-70:50-C were improved to 4.0±0.3 MPa and 750±11%, respectively. The results proved that increasing curing time resulted in the improvement of mechanical properties as shown in FIG. 16 (DMA curves).

It is a challenge to prepare low cost and elastic soy protein-rich blends. Interestingly, SSMP-NRV-70:50-C containing no glycerol remained elastic at ambient conditions, when dry and when wet. This indicates the structure of this material plays an important role. In the future work, the research focusing on the material structure should be done.

SSMP-NRV-70:50-U contained 15.2 wt % of water in theory, which is a disadvantage for curing because water will boil and produce bubbles in the sample if the curing temperature is higher than 100° C. Therefore, the curing temperature should be lower than 95° C. to avoid the production of bubbles. However, this disadvantage may become an advantage if blends are extruded to prepare foam at high temperatures, where water is a useful foam-forming agent.

Feasibility for Production on a Large Scale

Figure 10:
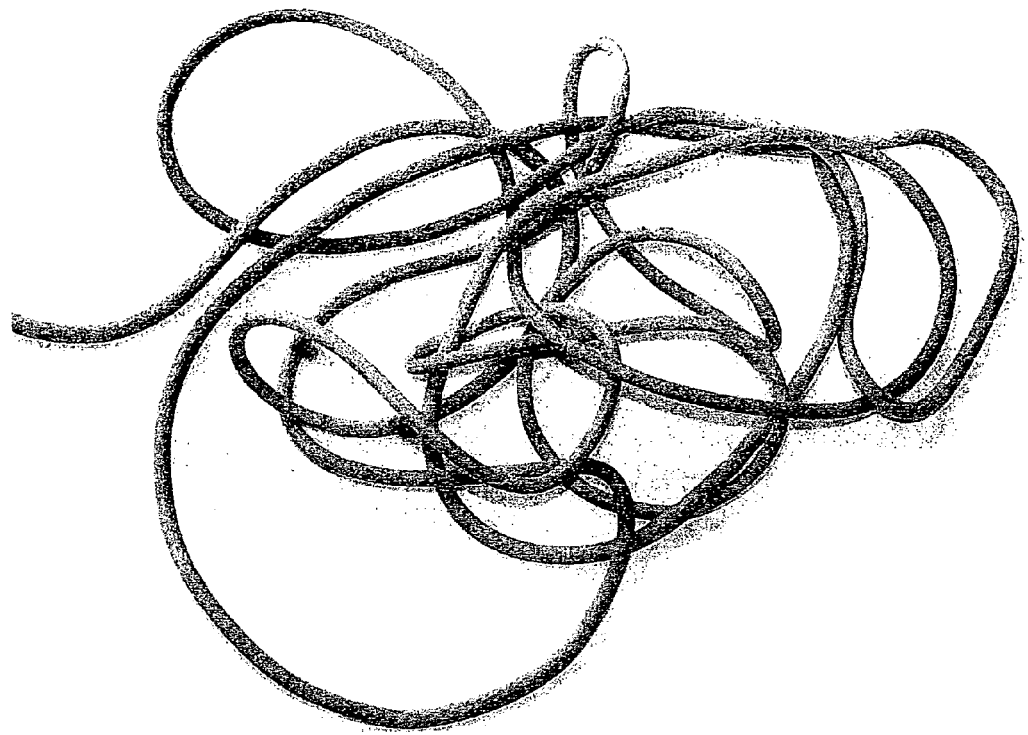
FIGS. 10 and 11 are images of Soy/bio-rubber bands.

A white bio-rubber band with a length of 3 m was successfully produced by the use of the same processing method as that used on SSMP-NRV-70:50-C, and vulcanized in an oven at 90° C. for 20 min. In FIG. 10, this bio-rubber band is elastic and can be used as a substitute for commercial rubber bands. Potential uses could include the binding of flowers, vegetables or trees.

If slit or annular dies are used, sheets, films or tubes can be easily produced from soy meal/natural rubber blends as shown in the scheme of FIG. 12. Therefore, products are not limited to bio-rubber band.

The extruder in the scheme of FIG. 12 should have good mixing ability to homogeneously blend hydrophilic SSMP

TABLE 14

Properties of SSMP-NRV-70:50-C, commercial rubber bands (Officemax ®) and soy meal thermoplastic

| Samples | SSMP content a % | Water uptake % | Ambient b σb MPa | Ambient b εb % | Dry c σb MPa | Dry c εb % | Wet d σb MPa | Wet d εb % |
|---|---|---|---|---|---|---|---|---|
| SSMP-NRV-70:50-C | 51.0 | 6.7 ± 1.2 | 2.8 ± 0.2 | 357 ± 12 | 3.1 ± 0.1 | 399 ± 7 | 3.0 ± 0.3 | 540 ± 30 |
| Officemax ® bands | 0 | 1.1 ± 0.1 | 4.4 ± 0.5 | 396 ± 11 | 3.0 ± 0.3 | 381 ± 28 | 3.6 ± 0.2 | 456 ± 34 |
| SSMP thermoplastic | 100 | 61.9 ± 3.5 | 7.0 ± 1.0 | 2.9 ± 0.4 | brittle | brittle | broken | broken | a SSMP content is dry SSMP/(NRV + dry SSMP) 100%.
b Samples were stored at ambient conditions.
c Samples were dried at 54° C. for 24 h.
d Samples were immersed in water for 24 h, then equilibrated at ambient conditions for 2 h.

The strength of SSMP-NRV-70:50-C (2.8 MPa) was less than that of commercial rubber bands (4.4 MPa). Rubber-based material has low thermal conductivity and the heat conduction ability of air in an oven is low. This reduces the amount of cross-linking because the effective cross-linking time for the samples is actually much shorter than 20 min., due to the time required for heating. Liquid has much better heating conduction ability than air, so the sample bars were first cured in a water bath at 90° C. for 20 min., and then stored at ambient conditions for 4 h. The stress/strain curves of the SSMP-NRV-70:50-C cured in water bath and commercial rubber bands are shown in FIG. 13. SSMP-NRV-70:50-C cured in a water bath showed similar mechanical properties (σb=4.1±0.5 MPa, εb=420±9%) to commercial rubber bands (σb=4.4±0.5 MPa, εb=396±11%). This result implies that SSMP-NRV-70:50-C can replace commercial rubber bands in some applications.

and hydrophobic NR. A pin extruder used in the rubber industry may be a satisfactory candidate because of its excellent ability to disrupt rubber at a low processing temperature (Iddon, M. I., Extrusion and extrusion machinery. In Rubber Products Manufacturing Technology; Bhowmick, A. K.; Hall, M. M.; Benarey, H. A.; Eds.; Marcel Dekker Inc.: New York, 1994, pp. 296).

Biodegradability of SSMP/NRV Blends

As is known, SSMP is a food for microorganism, so this component will be biodegraded directly. There are many double bonds in NR macromolecular chains that are easily attacked and degraded by oxygen, ozone and water. When the molecular weight of the environmentally degraded NR is low enough, microorganisms will start to use the NR fragments as food. Obviously, the biodegradability of cross-linked NR is dependent on the degree of cross-linking. Automobile tires are difficult to degrade because of their high degree of cross-linking and large amount of anti-microbial additives (Thorn, A. D.; Robinson, R. A. Compound design. In Rubber Products Manufacturing Technology; Bhowmick, A. K.; Hall, M. M.; Benarey, H. A.; Eds.; Marcel Dekker Inc.: New York, 1994; pp. 55). Commercial rubber bands are degradable because of their low degree of cross-linking. If commercial rubber bands are stored at ambient conditions for 1-2 years, they become sticky and lost their strength because of environmental degradation. Bode et al. (Bode, H. B.; Kerkhoff, K.; Jendrossek, D., Biomacromolecules 2001, 2, 295) reported that raw NR, NR latex gloves and synthetic isoprene rubber were biodegradable. After 6 weeks of incubation, the molecular weight distribution of the three materials showed a significant shift to a lower value. It is necessary to evaluate the biodegradability of the SSMP/NRV blends by use of standard biodegradability test methods.

Leaching Phenomenon of Protein-Based Polymers

After equilibration at 100% RH for 24 h, there was no visible leaching problem on the surface of films made from SSMP-NRV-70:50-U. But both sorbitol-plasticized SSMP films and glycerol-plasticized SPI films showed serious leaching problems. This is because at low relative humidity, protein molecular chains can fully interact with sorbitol or glycerol. Therefore, sorbitol and glycerol will not migrate from a protein matrix under low RH conditions. At high RH conditions, a protein matrix will absorb moisture from the environment, leading to an increase in water content in the protein matrix. The protein macromolecules will interact with water in preference to sorbitol or glycerol. Some of the sorbitol or glycerol molecules become free because of the loss of interaction, and migrate out of the protein matrix. Finally, liquid blossoms on the surface of the film, as evidence of the leaching problem. But the leaching problem has not been given much attention in most publications. (U.S. Pat. No. 6,632,925 to Zhang et al; U.S. Pat. No. 5,710,190 to Jane et al; U.S. Pat. No. 5,523,293 to Jane et al and U.S. Pat. No. 6,045,868 to Rayas et al).

Wind-blowing is a low cost and effective way to purify soy meal. Based on the results herein, the optimal extrusion conditions for SSMP are: 20% water and a processing temperature of 80-100° C. ZDEC made it possible for the SSMP/NRV blend to be processed at 75° C. and cured at 90° C. The bio-rubber band with 51 wt % SSMP was elastic, water resistant, without leaching problems and possessed similar mechanical properties to commercial rubber bands. Furthermore, it is possible to continuously produce low cost bands, sheets, films and tubes in an extruder. The results indicate that the technology has a potential for practical application.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the Claims attached herein.

We claim:

1. An uncured and unvulcanized thermoplastic blended composition which comprises: a mixture of
   (a) a preprocessed soy meal and water mixture which has been die extruded at 80-100° C., wherein soy meal has been preprocessed prior to being die extruded to remove hulls and cellulose fiber materials associated with soy beans and ground to a powder and then die extruded; and
   (b) an unvulcanized natural rubber, which is to be vulcanized, in admixture with sulfur as a vulcanization agent and a vulcanization accelerator, wherein the blended composition can be vulcanized to a thermoset solid.

2. The composition of claim 1 wherein the soy meal mixture to natural rubber mixture ratio is approximately 70:50 (w/w).

3. The composition of claim 1 wherein the vulcanization accelerator is a dithiocarbamate accelerator.

4. The composition of claim 3 wherein the dithiocarbamate accelerator is zinc diethyldithiocarbamate (ZDEC).

5. A thermoset blended composition which comprises: a die extruded mixture of
   (a) a preprocessed soy meal and water mixture which has been extruded at 80-100° C., wherein soy meal has been preprocessed prior to being die extruded to remove hulls and cellulose fiber materials associated with soy beans and ground to a powder and then die extruded; and
   (b) a vulcanized natural rubber in admixture with sulfur as a vulcanization agent and a vulcanization accelerator, wherein the blended composition has been vulcanized to a thermoset solid.

6. The composition of claim 5 wherein the soy meal mixture to natural rubber mixture ratio is approximately 70:50 (w/w).

7. The composition of claim 5 wherein the soy meal is approximately 51 percent by weight of the composition when dried.

8. The composition of claim 5 wherein the vulcanization accelerator is a dithiocarbamate accelerator.

9. The composition of claim 5 wherein the dithiocarbamate accelerator is zinc diethyldithiocarbamate (ZDEC).

10. The composition of claim 5 which has been vulcanized at approximately 90° C.

11. A method for the production of a thermoset blended composition which comprises: a die extruded mixture of
    (a) a mixture of a preprocessed soy meal and water mixture which has been die extruded at 80-100° C., wherein soy meal has been preprocessed prior to being die extruded to remove hulls and cellulose fiber materials associated with soy beans and ground to a powder and then die extruded; and unvulcanized natural rubber which is to be vulcanized in admixture with sulfur as a vulcanization agent, and a vulcanization accelerator; and
    (b) vulcanizing the blended composition to produce the thermoset solid composition.

12. The method of claim 11 wherein the vulcanization is performed between 25° C. and 140° C.

13. The method of claim 11 wherein the soy meal mixture to natural rubber mixture ratio is approximately 70:50 (w/w).

14. The method of claim 11 wherein the vulcanization of accelerator is a dithiocarbamate accelerator.

15. The method of claim 14 wherein the dithiocarbamate accelerator is zinc diethyldithiocarbamate (ZDEC).

16. The method of claim 11 wherein the soy meal is approximately 51 percent by weight of the thermoset composition when dried.

17. A thermoset blended composition which comprises: a die extruded mixture of
    (a) a preprocessed soy meal and water mixture, which has been die extruded at elevated temperatures, wherein the soy meal has been preprocessed prior to being extruded to remove hulls and cellulose fiber materials associated with soy beans and ground to a powder and then die extruded; and
    (b) vulcanized natural rubber which has been vulcanized with the die extruded processed soy meal to produce the composition.

18. The composition of claim 17 wherein the composition comprises 30% to 70% of the soy meal, 12.5% to 62.5% of the rubber which has been vulcanized, and 7.5% to 17.5% of the water, all by a total weight of the composition.

19. The composition of claim 17 or 18 wherein the rubber was vulcanized with sulfur as a vulcanization agent and a vulcanization accelerator.

20. The composition of claim 17 or 18 wherein the rubber was vulcanized with sulfur and zinc diethyldithiocarbamate (ZDEC) as a vulcanization accelerator.

21. The composition of claim 17 which is substantially free of organic plasticizers.

22. An uncured and unvulcanized thermoplastic blended composition which comprises: a die extruded mixture of
   (a) a preprocessed soy meal and water mixture which has been die extruded at elevated temperatures, wherein soy meal has been preprocessed prior to being die extruded to remove hulls and cellulose fiber materials associated with soy beans and ground to a powder and then die extruded; and
   (b) unvulcanized natural rubber which is to be vulcanized in admixture with sulfur as a vulcanization agent and a vulcanization accelerator, wherein the blended composition can be vulcanized to a thermoset solid.

23. The composition of claim 22 wherein the composition comprises 30% to 70% of the soy meal, 12.5% to 62.5% of the vulcanized natural rubber, and 7.5% to 17.5% by weight of the water after vulcanization, all by a total weight of the composition.

24. The composition of claim 22 or 23 wherein the unvulcanized natural rubber comprises sulfur as a vulcanization agent and zinc diethyldithiocarbamate (ZDEC) as an accelerator.

25. The composition of claim 22 or 23 which is substantially free of organic plasticizers.

26. A method for the production of a thermoset blended composition which comprises:
   (a) blending a mixture of a preprocessed soy meal and water mixture which has been die extruded at elevated temperatures, wherein soy meal has been preprocessed prior to being die extruded to remove hulls and cellulose fiber materials associated with soy beans and ground to a powder, and unvulcanized natural rubber in admixture with sulfur as a vulcanization agent, and a vulcanization accelerator which is to be vulcanized with the die extruded processed soy meal; and
   (b) vulcanizing the blended composition to produce the thermoset solid composition.

27. The method of claim 26 wherein the vulcanization is between 25° C. and 140° C.

28. The method of claim 26 wherein the soy meal is in a particle form and is exposed to an air stream to remove the hull materials from the soy meal.

29. The composition of claim 17 as a film, band or tube.

* * * * *

UNITED STATES PATENT AND TRADEMARK OFFICE
CERTIFICATE OF CORRECTION

PATENT NO. : 7,649,036 B2  Page 1 of 1
APPLICATION NO. : 11/200593
DATED : January 19, 2010
INVENTOR(S) : Amar K. Mohanty, Qiangxian Wu and Susan Selke It is certified that error appears in the above-identified patent and that said Letters Patent is hereby corrected as shown below:

Column 8, line 28, "were added into" should be --were not added into--.

Signed and Sealed this

Twenty-seventh Day of April, 2010

David J. Kappos
*Director of the United States Patent and Trademark Office*